(12) United States Patent
Satoh et al.

(10) Patent No.: US 11,048,081 B2
(45) Date of Patent: Jun. 29, 2021

(54) DISPLAY DEVICE, DISPLAY SYSTEM, AND MOBILE OBJECT

(71) Applicants: Yuuki Satoh, Kanagawa (JP); Kazuhiro Fujita, Tokyo (JP); Maiko Yasui, Kanagawa (JP)

(72) Inventors: Yuuki Satoh, Kanagawa (JP); Kazuhiro Fujita, Tokyo (JP); Maiko Yasui, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/658,168

(22) Filed: Oct. 21, 2019

(65) Prior Publication Data

US 2020/0150433 A1 May 14, 2020

(30) Foreign Application Priority Data

Nov. 8, 2018 (JP) ............................. JP2018-210920
Jul. 29, 2019 (JP) ............................. JP2019-138496

(51) Int. Cl.
*G02B 27/01* (2006.01)
*G02B 5/10* (2006.01)
(Continued)

(52) U.S. Cl.
CPC ........... *G02B 27/0101* (2013.01); *G02B 5/10* (2013.01); *G02B 26/0833* (2013.01);
(Continued)

(58) Field of Classification Search
CPC .......... B60K 2370/31; B60K 2370/334; B60K 35/00; G02B 2027/014; G02B 2027/0154;
(Continued)

(56) References Cited

U.S. PATENT DOCUMENTS

2015/0092118 A1* 4/2015 Hada ...................... G02B 27/01
349/11
2017/0139206 A1* 5/2017 Sugikawa ............ G02B 5/0833
(Continued)

FOREIGN PATENT DOCUMENTS

JP 2000-137189 5/2000
JP 2001-097073 4/2001
(Continued)

OTHER PUBLICATIONS

Extended European Search Report dated Mar. 11, 2020, issued in corresponding European Patent Application No. 19202027.9, 9 pages.

*Primary Examiner* — Richard J Hong
(74) *Attorney, Agent, or Firm* — Xsensus LLP

(57) ABSTRACT

A display device, a display system, and a mobile object. The display device includes an image forming unit through which image light exits, an imaging optical system having a reflection plane and configured to form an image by reflecting the image light on the reflection plane, and a housing accommodating the image forming unit and the imaging optical system. The housing has a transmissive area through which the image light reflected by the imaging optical system passes through, and an inclination of the reflection plane is changed to reduce a project area of the reflection plane. The project area is projected to outside of the housing through the transmissive area. The display system includes the display device, and a reflector configured to reflect the image light reflected by the imaging optical system. The mobile object includes the display system, and the reflector is a front windshield.

14 Claims, 14 Drawing Sheets

(51) Int. Cl.
  *G02B 26/08* (2006.01)
  *G02B 26/10* (2006.01)
(52) U.S. Cl.
  CPC ........ *G02B 26/101* (2013.01); *B60K 2370/31* (2019.05); *B60K 2370/334* (2019.05); *G02B 2027/014* (2013.01)
(58) Field of Classification Search
  CPC ........ G02B 2027/0181; G02B 26/0833; G02B 26/101; G02B 27/0101; G02B 27/0149; G02B 5/10; G02B 27/01; G02B 6/0051; G02B 5/282
  See application file for complete search history.

(56) References Cited

U.S. PATENT DOCUMENTS

| | | |
|---|---|---|
| 2018/0252916 A1 | 9/2018 | Nakamura et al. |
| 2019/0162961 A1* | 5/2019 | Yokoe .................... B60K 35/00 |
| 2019/0227308 A1* | 7/2019 | Yokoe .................... G02B 5/282 |
| 2019/0265472 A1* | 8/2019 | Sugiyama ............ G02B 6/0051 |
| 2019/0285884 A1 | 9/2019 | Fujita et al. |
| 2019/0285885 A1 | 9/2019 | Satoh et al. |
| 2019/0285887 A1 | 9/2019 | Yasui et al. |
| 2020/0124848 A1* | 4/2020 | Habermehl ........ G02B 27/0101 |
| 2020/0159013 A1* | 5/2020 | Hirata ................ G02B 27/0101 |
| 2020/0218071 A1* | 7/2020 | Aoki ...................... G02B 27/01 |

FOREIGN PATENT DOCUMENTS

| | | |
|---|---|---|
| JP | 2005-309196 A | 11/2005 |
| JP | 2005-331624 | 12/2005 |
| JP | 2008-268680 A | 11/2008 |
| JP | 2018-010138 | 1/2018 |
| JP | 2018-146950 | 9/2018 |
| JP | 2019-159283 | 9/2019 |
| JP | 2019-159285 | 9/2019 |
| JP | 2019-164239 | 9/2019 |

* cited by examiner

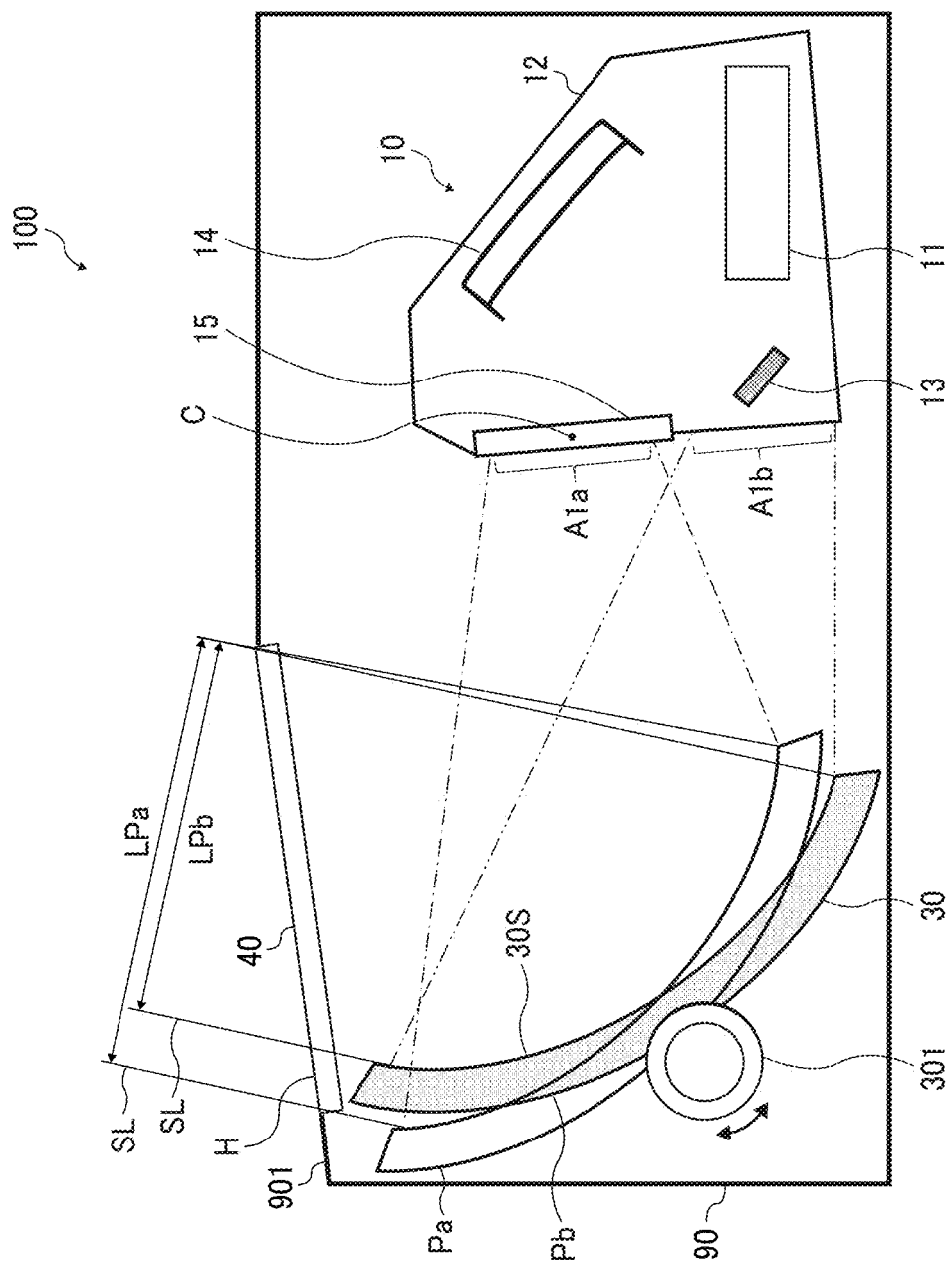
FIG. 12
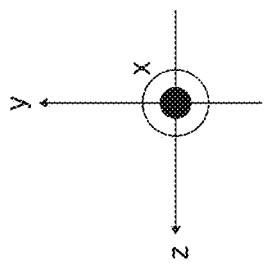

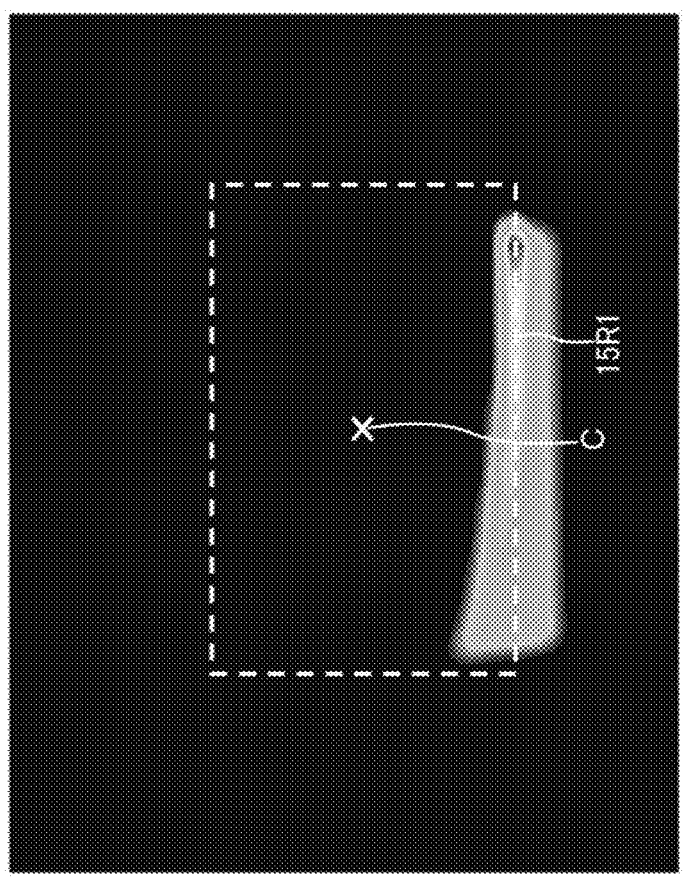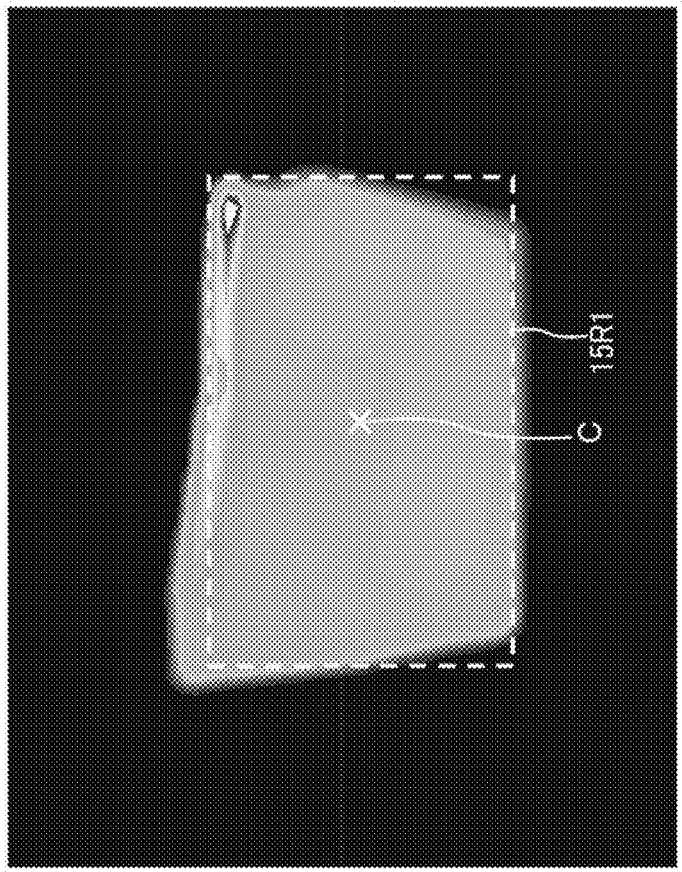
FIG. 19A
FIG. 19B

DISPLAY DEVICE, DISPLAY SYSTEM, AND MOBILE OBJECT

CROSS-REFERENCE TO RELATED APPLICATIONS

This patent application is based on and claims priority pursuant to 35 U.S.C. § 119(a) to Japanese Patent Application Nos. 2018-210920 and 2019-138496, filed on Nov. 8, 2018, and Jul. 29, 2019, respectively, in the Japan Patent Office, the entire disclosures of which are hereby incorporated by reference herein.

BACKGROUND

Technical Field

Embodiments of the present disclosure relate to a display device, a display system, and a mobile object.

Background Art

Display devices such as a heads-up display (HUD) are used as an application in a mobile object such as a vehicle that allows a driver (viewer) to recognize various kinds of information (for example, vehicle information, navigation information, and warning information) with a reduced amount of movement in line of vision.

For example, an apparatus is known in the art in which the sunlight is reflected by the reflection plane towards the lower side of a liquid crystal panel and the sunlight is prevented from striking the liquid crystal panel in the reverse direction to protect the liquid crystal panel from the damage caused by the heat wave of the sunlight, even when the sunlight passes through a front windshield and is incident on the reflection plane of a reflecting mirror.

SUMMARY

Embodiments of the present disclosure described herein provide a display device, a display system, and a mobile object. The display device includes an image forming unit through which image light exits, an imaging optical system having a reflection plane on a surface of the imaging optical system and configured to form an image by reflecting the image light on the reflection plane, and a housing accommodating the image forming unit and the imaging optical system. The housing has a transmissive area through which the image light reflected by the imaging optical system passes through, and an inclination of the reflection plane is changed to reduce a project area of the reflection plane. The project area is projected to outside of the housing through the transmissive area. The display system includes the display device, and a reflector configured to reflect the image light reflected by the imaging optical system. The imaging optical system projects the image light towards the reflector to form a virtual image. The mobile object includes the display system, and the reflector is a front windshield.

BRIEF DESCRIPTION OF THE DRAWINGS

A more complete appreciation of embodiments and the many attendant advantages thereof will be readily obtained as the same becomes better understood by reference to the following detailed description when considered in connection with the accompanying drawings.

FIG. 12 is a diagram illustrating the project area of the reflection plane of a free-form surface mirror, according to an embodiment of the present disclosure.

FIG. 19A and FIG. 19B are diagrams each illustrating the illumination distribution on an image forming unit due to the extraneous light, according to an embodiment of the present disclosure.

Figure 1:
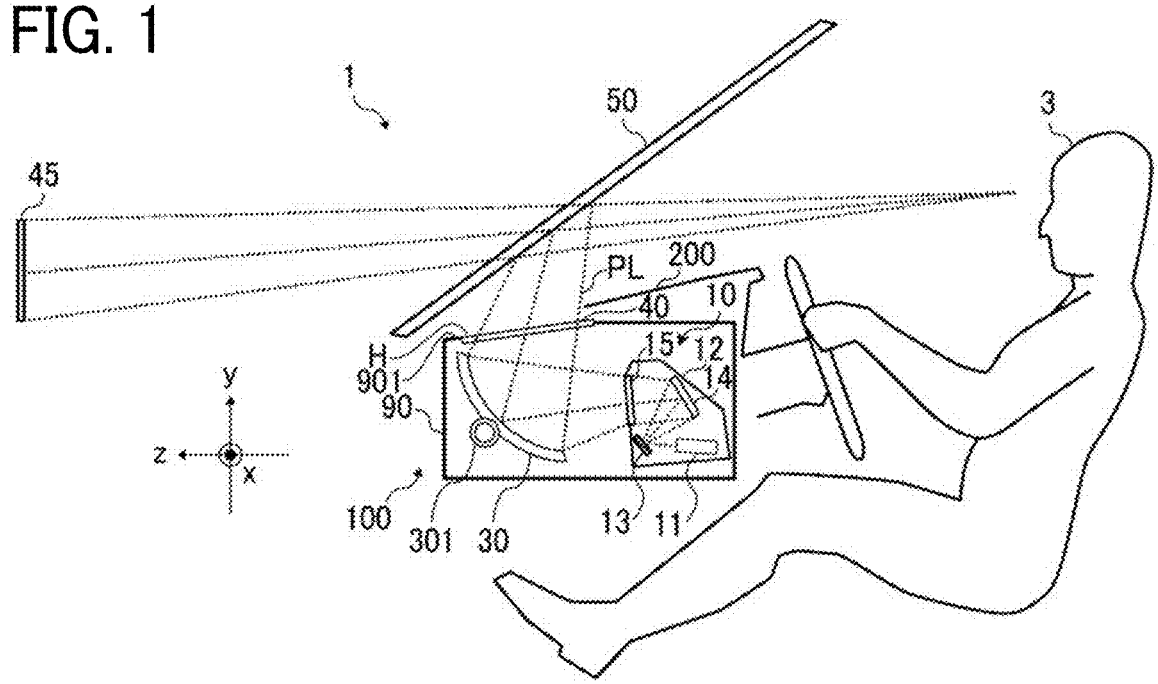
FIG. 1 is a diagram illustrating a system configuration of a display system according to a first embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

Embodiments of the present disclosure are described below with reference to the accompanying drawings. In the description of the drawings, like reference signs denote like elements, and overlapping descriptions are omitted.

FIG. 1 is a diagram illustrating a system configuration of a display system 1 according to a first embodiment of the present disclosure.

In the display system 1, the viewer 3 can visually identify a display image as the projection light PL that is projected from a display device 100 is projected onto a transmissive reflector. The display image is image superimposed on the viewing field of the viewer 3 as a virtual image 45. For example, the display system 1 is provided for a mobile object such as a vehicle, an aircraft, and a ship, or an immobile object such as a maneuvering simulation system, and a home-theater system. In the present embodiment, cases in which the display system 1 is provided for a vehicle as an example of the mobile object is described. However, no limitation is intended thereby, and the type of usage of the display system 1 is not limited to the present embodiment.

For example, the display system 1 is mounted in a vehicle, and makes navigation information visible to the viewer 3 (i.e., the driver) through a front windshield 50 of the vehicle. The navigation information includes, for example, the information about the speed of the vehicle, the course information, the distance to a destination, the name of the current place, the presence or position of an object ahead of the vehicle, a traffic sign indicating, for example, speed limit, and traffic congestion, and aids the driving of the vehicle. In such cases, the front windshield 50 serves as a transmissive reflector that transmits a portion of the incident light and reflects at least some of the remaining incident light. The distance between the location of the eyepoint of the viewer 3 and the front windshield 50 is about several tens of centimeters (cm) to one meter (m).

The display system 1 includes a display device 100 and a front windshield 50. For example, the display device 100 is a heads-up display (HUD) provided for a vehicle as an example of the mobile object. The display device 100 may be arranged at any desired position in conformity with the interior design of the vehicle. For example, the display device 100 according to the present embodiment may be disposed under a dashboard 200 of the vehicle or built into the dashboard of the vehicle.

Moreover, the display device 100 includes an image forming unit 10, a free-form surface mirror 30, and a housing 90. The image forming unit 10 includes a light-source device 11, a unit housing 12, a light deflector 13, a mirror 14, and a screen 15.

The light-source device 11 that is an example of a light source is a device that emits the laser beams emitted from a light source to an area outside the device. For example, the light-source device 11 may emit laser beams in which three-color laser beams of red, green, and blue (RGB) are combined. The laser beams that are emitted from the light-source device 11 are guided to the reflection plane of the light deflector 13. For example, the light-source device 11 has a semiconductor light-emitting element such as a laser diode (LD) that serves as a light source. However, no limitation is intended thereby, and the light source may be a semiconductor light-emitting element such as a light-emitting diode (LED).

The light deflector 13 uses, for example, a micro-electromechanical systems (MEMS) to change the directions of travel of the laser beams. For example, the light deflector 13 is configured by a scanner such as a mirror system composed of one minute MEMS mirror that pivots around two axes orthogonal to each other or two MEMS mirrors that pivot or rotates around one axis. The laser beams that are emitted from the light deflector 13 scans the mirror 14. The light deflector 13 is not limited to a MEMS mirror, but may be configured by a polygon mirror or the like.

For example, the mirror 14 is a concave mirror, and reflects the laser beams, which are deflected by the light deflector 13 and scan the reflection plane of the mirror 14, towards the screen 15.

A two-dimensional intermediate image (image light) is formed on the screen 15, which serves as an image forming unit, as the laser beams reflected by the reflection plane of the mirror 14 scan the surface of the screen 15. Note also that the screen 15 serves as a divergent part through which the scanned laser beams diverge at a predetermined divergence angle. For example, the screen 15 may consist of an exit pupil expander (EPE), and may be configured by a transmissive optical element such as a microlens array (MLA) or diffuser panel that diffuses light. Alternatively, the screen 15 may be configured by a reflective optical element such as a micromirror array that diffuses light.

The light-source device 11, the light deflector 13, the mirror 14, and the screen 15 are stored in the unit housing 12, and serve as a part of the image forming unit 10. The screen 15 is not covered by the unit housing 12 in its entirety such that the diverging light diverging through the screen 15 can be emitted outside the image forming unit 10, but is partially held by the unit housing 12. The unit housing 12 may be a single unit of three-dimensional object, or may be configured by a combination of a plurality of members. As an example configuration or structure in which a combination of a plurality of members are combined, the unit housing 12 may be configured by a combination of a plurality of members including the light-source device 11, the light deflector 13, the mirror 14, a three-dimensional object that covers the optical path in its entirety, and a holder or the like that holds the screen 15.

The virtual image 45 is a magnified view of the intermediate image that is formed on the screen 15, and such a virtual image is achieved as the laser beams (light flux) that are the light diverging through the screen 15 are projected onto the free-form surface mirror 30 and the front windshield 50. The free-form surface mirror 30 is designed and arranged so as to cancel, for example, the inclination of the image, the distortion of the image, and the displacements of the image, which are caused by the bent shape of the front windshield 50. The free-form surface mirror 30 may be arranged in a pivotable manner around a rotation axis 301. For example, the rotation axis 301 passes through the center of gravity of the free-form surface mirror 30, and the free-form surface mirror 30 is rotated on a straight line parallel to the direction orthogonal to the sheet of FIG. 1 to change the position at which the virtual image 45 is displayed in the up-and-down directions on the sheet of FIG. 1. Due to such a configuration, the free-form surface mirror 30 can adjust the reflection direction of the laser beams (light flux) emitted from the screen 15 to change the position at which the virtual image 45 is displayed according to the positions of the eyes of the viewer (driver) 3.

The free-form surface mirror 30, which is an example of an imaging optical system, reflects the diverging light to project the projection light PL in order to form a virtual image with the light diverging through the screen 15. Due to this configuration, the free-form surface mirror 30 is designed using, for example, a commercially available optical design simulation software, such that the free-form surface mirror 30 has a certain level of light-gathering power to achieve a desired image-forming position of the virtual image 45. In the display device 100, the light-gathering power of the free-form surface mirror 30 is designed such that the virtual image 45 is displayed at a position away from the location of the eyepoint of the viewer 3 in the depth direction by, for example, at least 1 m and equal to or shorter than 30 m (preferably, equal to or shorter than 10 m).

The imaging optical system is satisfactory as long as it includes at least one light-concentrating element that has a light-concentrating function. Such a light-concentrating element that has a light-concentrating function is not limited to a free-form surface mirror like the free-form surface mirror 30, and may be, for example, a concave mirror, a curved-surface mirror, and a Fresnel reflector element. For example, such a light-concentrating element is formed by performing sputtering or vapor deposition on a thin metal film such as of aluminum (Al) and silver (Ag) with high reflectivity, Due to such a configuration, the utilization efficiency of the light incident on a light-concentrating element as the projection light PL can be maximized, and a virtual image with high brightness can be obtained.

The projection light PL that is reflected by the free-form surface mirror 30 is projected outside the display device 100 from a slit formed on the housing 90, and is incident on the front windshield 50. As illustrated in FIG. 1, a hole H is formed on the housing 90 by a hole surrounding area 901. The hole H is an example of a transmissive area through which the light passes through between the inside and outside of the housing 90, and the rest of the outer circumferential surface of the housing 90, excluding the hole H, blocks the light at a boundary between the inside and outside of the housing 90. The hole surrounding area 901 is a part of the housing 90 around the hole H. The position and size of the hole H is determined depending on the size of the hole surrounding area 901 and the position at which the hole surrounding area 901 is arranged. In order to prevent a foreign substance from entering the housing 90 through the hole H, a dustproof window 40 is arranged so as to close the hole H. In particular, it is desired that the dustproof window 40 be made of a material through which the projection light PL can pass through.

The front windshield 50 is an example of a reflector, and serves as a transmissive reflector that transmits some of the laser beams (bundle of laser beams) and reflects at least some of the remaining laser beams (partial reflection). The front windshield 50 may serve as a semitransparent mirror through which the viewer 3 visually recognizes the virtual image 45 and the scenery ahead of the mobile object (vehicle). The virtual image 45 is an image that is visually recognized by the viewer 3, including vehicle-related information (e.g., speed and travel distance), navigation information (e.g., route guidance and traffic information), and warning information (e.g., collision warning). For example, the transmissive reflector may be another front windshield arranged in addition to the front windshield 50.

The virtual image 45 may be displayed so as to be superimposed on the scenery ahead of the front windshield 50. The front windshield 50 is not flat but is curved. For this reason, the position at which the virtual image 45 is formed is determined by the curved surface of the free-form surface mirror 30 and the front windshield 50. In some embodiments, the front windshield 50 may be a semitransparent mirror (combiner) that serves as a separate transmissive having a reflector partial reflection function.

In the present embodiment, the hole H on the housing 90, which is shaped by the hole surrounding area 901, has, at least, a size to secure the angle of view required to project the virtual image 45 on the eye-lip area of the viewer 3. The plane of the free-form surface mirror 30 is designed and shaped so as to reduce the optical strain that occurs on the front windshield 50 as. The light beams that are incident on the free-form surface mirror 30 are reflected by the free-form surface mirror 30 according to the shape of the plane of the free-form surface mirror 30. The reflected bundles of laser beams (light flux) are then incident on the front windshield 50, and reach at least one eyepoint within an eye-lip area including at least the eye-lip center (i.e., the reference eyepoint). The bundles of laser beams that are incident on the front windshield 50 are reflected according to the shape of the surface of the front windshield 50.

Due to such a configuration as above, the laser beams (light flux) that are emitted from the screen 15 are projected towards the free-form surface mirror 30. The projection light that is concentrated by the free-form surface mirror 30 passes through the hole H of the housing 90 and is projected towards the front windshield 50, and is reflected by the front windshield 50. Accordingly, the viewer (driver) 3 can visually recognize the virtual image 45, i.e., a magnified image of the intermediate image formed on the screen 15, due to the light reflected by the front windshield 50.

A method of projecting an image using the display device 100 may be implemented by a panel system or a laser scanning system. In the panel system, an intermediate image is formed by an imaging device such as a liquid crystal panel, a digital micromirror device (DMD) panel (digital mirror device panel), or a vacuum fluorescent display (VFD). In the laser scanning system, an intermediate image is formed by scanning the laser beams emitted from the light-source device 11, using an optical scanner.

The display device 100 according to the first embodiment of the present disclosure adopts the laser scanning system. In particular, in the laser scanning system, since emitting/non-emitting can be assigned to each pixel, in general, a high-contrast image can be formed. In some alternative embodiments, the panel system may be adopted as the projection system in the display device 100. In any system, it is desired that some of or the entirety of the screen 15 on which a real image is formed be made of resin.

Figure 2:
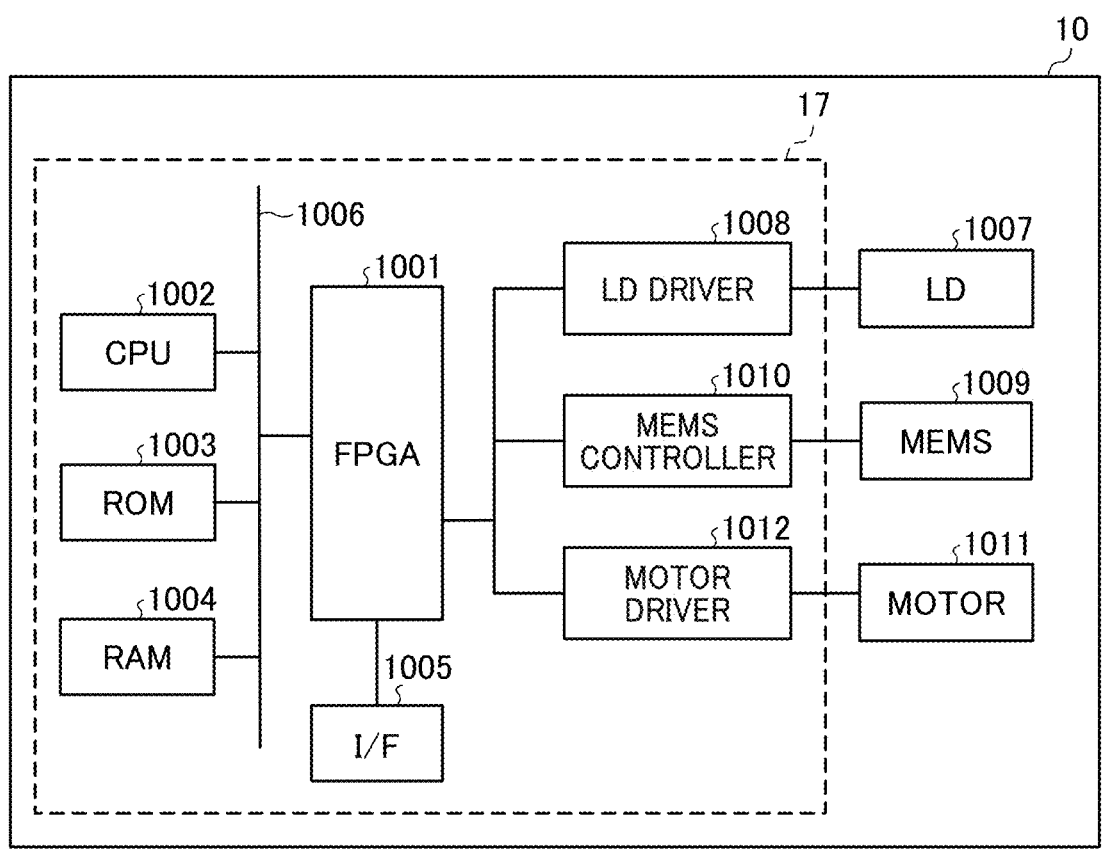
FIG. 2 is a diagram illustrating a hardware configuration of a display device according to the first embodiment of the present disclosure.

FIG. 2 is a diagram illustrating a hardware configuration of a display device according to the first embodiment of the present disclosure.

The hardware configuration illustrated in FIG. 2 may be adopted in common among the embodiments of the present disclosure. Alternatively, some components or elements may be added to or deleted from the hardware configuration of FIG. 2.

The display device 100 includes a controller 17 that controls the operation of the display device 100. For example, the controller 17 is a circuit board or integrated circuit (IC) chip mounted inside the display device 100. The controller 17 includes a field-programmable gate array (FPGA) 1001, a central processing unit (CPU) 1002, a read only memory (ROM) 1003, a random access memory (RAM) 1004, an interface (I/F) 1005, a data bus line 1006, a laser diode (LD) driver 1008, a micro-electromechanical systems (MEMS) controller 1010, and a motor driver 1012.

The FPGA 1001 is an integrated circuit that is configurable by the designer of the display device 100, The LD driver 1008, the MEMS controller 1010, and the motor driver 1012 generate a driving signal according to the control signal output from the FPGA 1001. The CPU 1002 is an integrated circuit that controls the entirety of the display device 100. The ROM 1003 is a storage device that stores a program for controlling the CPU 1002. The RAM 1004 is a storage device that serves as a work area of the CPU 1002. The interface 1005 communicates with an external device. For example, the interface 1005 is coupled to the controller area network (CAN) of a vehicle.

For example, the LD 1007 is a semiconductor light-emitting element that configures a part of the light-source device 11. The LD driver 1008 is a circuit that generates a driving signal for driving the LD 1007. The MEMS 1009 configures a part of the light deflector 13 and moves the scanning mirror. The MEMS controller 1010 is a circuit that generates a driving signal for driving the MEMS 1009. The motor 1011 is an electric motor that rotates the rotation axis 301 of the free-form surface mirror 30. The motor driver 1012 is a circuit that generates a driving signal for driving the motor 1011.

Figure 3:
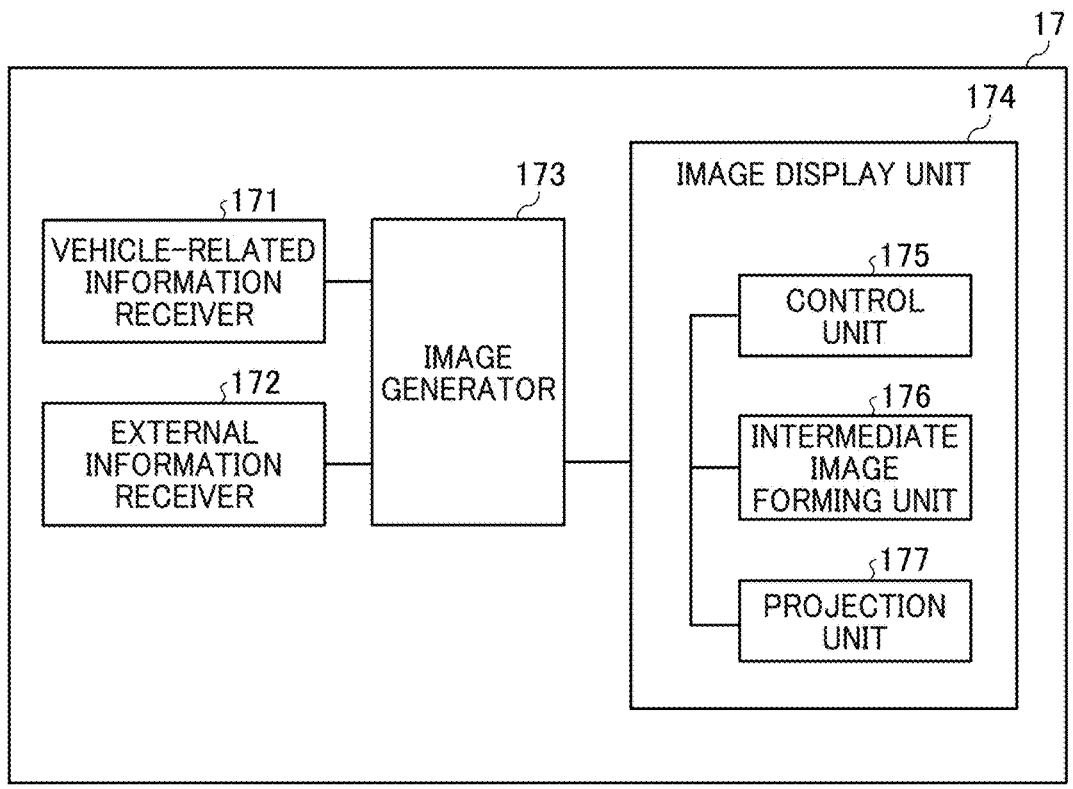
FIG. 3 is a diagram illustrating a functional configuration of a control system according to the first embodiment of the present disclosure.

FIG. 3 is a diagram illustrating a functional configuration the display device 100 according to the first embodiment of the present disclosure.

The functions that are implemented by the display device 100 include a vehicle-related information receiver 171, an external information receiver 172, an image generator 173, and an image display unit 174.

The vehicle-related information receiver 171 is a function to receive vehicle-related information (e.g., speed and travel distance) from a controller area network (CAN) or the like. For example, the vehicle-related information receiver 171 is implemented by some of the elements illustrated in FIG. 2. In particular, the vehicle-related information receiver 171 may be implemented by the interface 1005, the processing performed by the CPU 1002, and a program stored in the ROM 1003.

The external information receiver 172 receives external information (for example, position information from the global positioning system (GPS), routing information from a navigation system, and traffic information) of the vehicle from an external network. For example, the external information receiver 172 is implemented by some of the elements illustrated in FIG. 2. In particular, the external information receiver 172 may be implemented by the interface 1005, the processing performed by the CPU 1002, and a program stored in the ROM 1003.

The image generator 173 is a function to generate image data, which is used to display the intermediate image and the virtual image 45, based on the data input from the vehicle-related information receiver 171 and the external information receiver 172. For example, the image generator 173 is implemented by some of the elements illustrated in FIG. 2. In particular, the image generator 173 may be implemented by the processing performed by the CPU 1002, and a program stored in the ROM 1003.

The image display unit 174 is a function to form an intermediate image on the screen 15 based on the display data generated by the image generator 173, and to project the laser beams (bundle of laser beams) that form the intermediate image towards the front windshield 50 to display the virtual image 45. For example, the image display unit 174 is implemented by some of the elements illustrated in FIG. 2. In particular, the image display unit 174 may be implemented by the processing performed by the CPU 1002, the FPGA 1001, the LD driver 1008, the MEMS controller 1010, and the motor driver 1012, as well as a program stored in the ROM 1003.

The image display unit 174 includes a control unit 175, an intermediate image forming unit 176, and a projection unit 177. In order to form an intermediate image, the control unit 175 generates a control signal used to control the operation of the light-source device 11 and the light deflector 13, Moreover, the control unit 175 generates a control signal that controls the operation of the free-form surface mirror 30 to display the virtual image 45 at a desired position.

The intermediate image forming unit 176 forms an intermediate image on the screen 15 based on the control signal generated by the control unit 175, The projection unit 177 projects the laser beams that form an intermediate image towards the transmissive reflector (e.g., the front windshield 50) in order to form the virtual image 45 to be visually recognized by the viewer 3.

Figure 4:
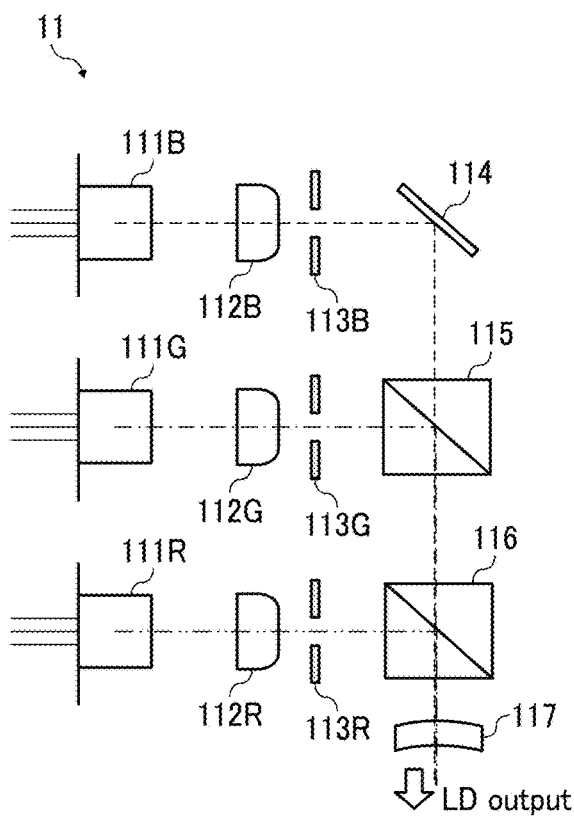
FIG. 4 is a diagram illustrating a specific configuration of a light source according to the first embodiment of the present disclosure.

FIG. 4 is a diagram illustrating a specific configuration of the light-source device 11 according to the first embodiment of the present disclosure.

The light-source device 11 includes light-source elements 111R, 111G, and 111B (these light-source elements may be referred to simply as a light-source element 111 in the following description when it is not necessary to distinguish each of the light-source elements), coupling lenses 112R, 112G, and 112B, apertures 113R, 113G, and 113B, combiners 114, 115, and 116, and a lens 117.

For example, each of the light-source elements 111 R, 111 G, and 111B of three colors (R, G, B) of three colors (red, green, and blue (RGB)) is a laser diode (LD) having a single or a plurality of light-emitting points. The light-source elements 111R, 111G, and 111B emit bundles of laser beams (light flux) having different wavelengths and λB, respectively. For example, λR=640 nanometers (nm), λG=530 nm, and λB=445 nm.

The emitted bundles of laser beams (light flux) are coupled by the coupling lenses 112R, 112G, and 112B, respectively. The coupled bundles of laser beams (light flux) are shaped by the apertures 113R, 113G, and 113B, respectively. The shape of the apertures 113R, 113G, and 113B may be various kinds of shape such as a circle, an ellipse, a rectangle, and a square depending on, for example, certain predetermined conditions such as the divergence angle of the bundles of laser beams (light flux).

The laser beams (light flux) that are shaped by the apertures 113R, 113G, and 113B are combined by the three combiners 114, 115, and 116, respectively. The combiners 114, 115, and 116 are plate-like or prismatic dichroic mirrors, and reflect or transmit the laser beams (light flux) therethrough according to the wavelength of the laser beams to combine the laser beams into one bundle of laser beams (light flux) that travels along one optical path. The combined bundle of laser beams (light flux) passes through the lens 117 and is guided to the light deflector 13.

Figure 5:
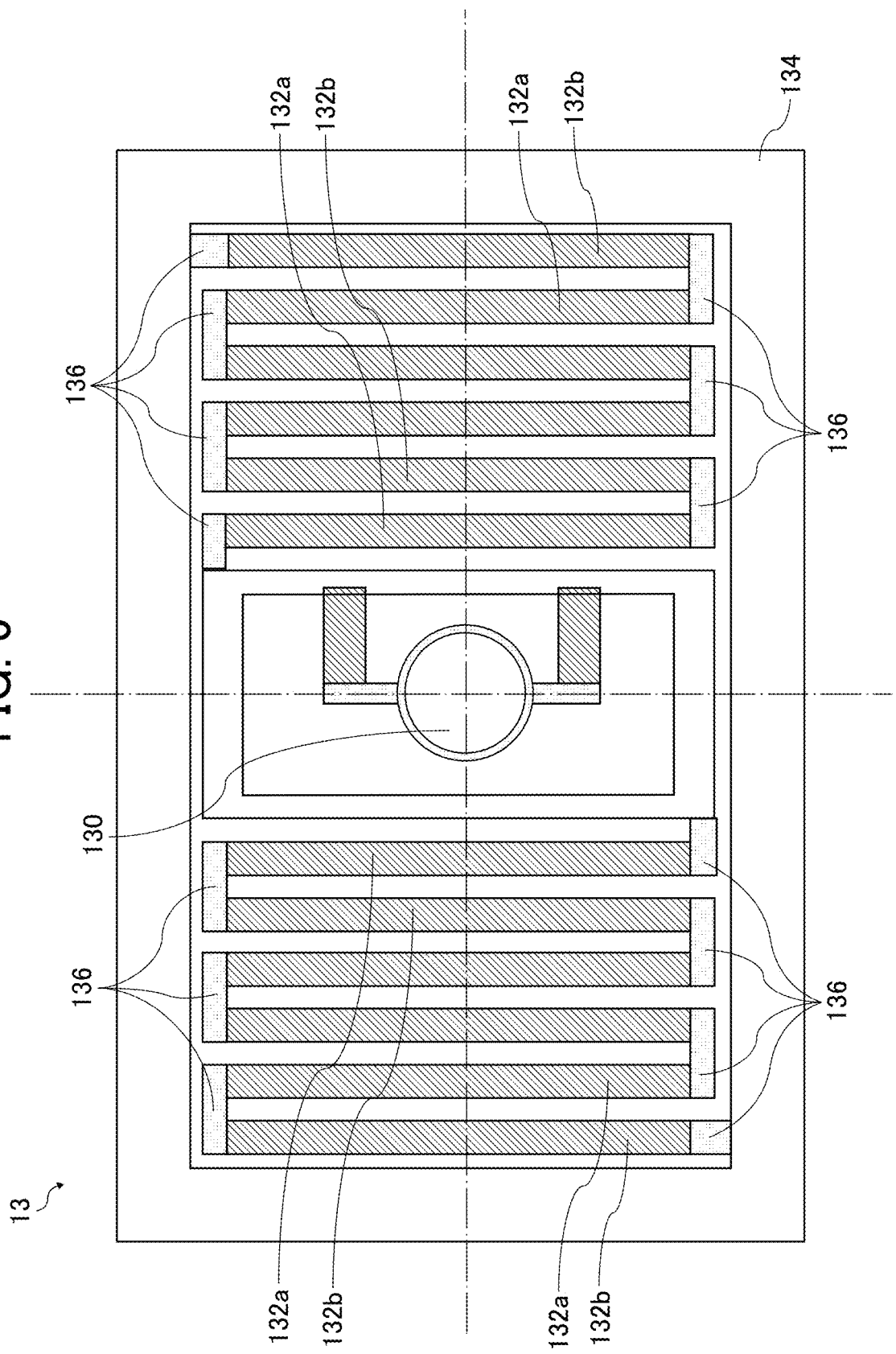
FIG. 5 is a diagram illustrating a specific configuration of a light deflector according to the first embodiment of the present disclosure.

FIG. 5 is a diagram illustrating a specific configuration of the light deflector 13 according to the first embodiment of the present disclosure.

The light deflector 13 is a MEMS mirror produced by semiconductor processing, and includes a mirror 130, a serpentine beam 132, a frame 134, and a piezoelectric member 136. The light deflector 13 is an example of a scanner.

The mirror 130 has a reflection plane that reflects the laser beams emitted from the light-source device 11 towards the screen 15 side. In the light deflector 13, a pair of serpentine beams 132 are formed across the mirror 130. Each of the pair of serpentine beams 132 has a plurality of turning portions. Each of these turning portions is configured by a first beam 132a and a second beam 132b that are arranged alternately. Each of the pair of serpentine beams 132 is supported by the frame 134. The piezoelectric member 136 is disposed such that the first beam 132a and the second beam 132b, which are adjacent to each other, are coupled to each other. The piezoelectric member 136 applies different levels of voltage to the first beam 132a and the second beam 132b to bend each of the first beam 132a and the second beam 132b differently.

As a result, the first beam 132a and the second beam 132b, which are adjacent to each other, bend in different directions. As the bending force is accumulated, the mirror 130 rotates in the vertical direction around the horizontal axis. Due to such a configuration as above, the light deflector 13 can perform optical scanning in the vertical direction at a low voltage. An optical scanning in the horizontal direction around the axis in the vertical direction is implemented by the resonance produced by a torsion bar or the like coupled to the mirror 130.

Figure 6:
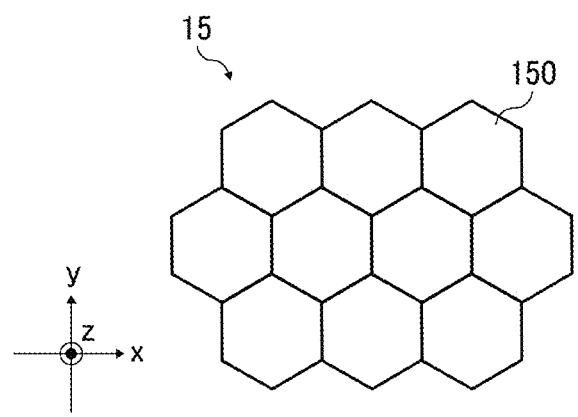
FIG. 6 is a diagram illustrating a specific configuration of a screen according to the first embodiment of the present disclosure.

FIG. 6 is a diagram illustrating a specific configuration of the screen 15 according to the first embodiment of the present disclosure.

The laser beams emitted from the LD 1007 that configures a part of the light-source device 11 on the screen 15. The screen 15 serves as a divergent part that diverges the laser beams at a predetermined divergence angle. The screen 15 as illustrated in FIG. 6 has a microlens-array structure in which a plurality of hexagonal-shaped microlenses 150 are arranged with no gap therebetween. For example, the width of each of the microlenses 150 (the distance between two sides that face each other) is optimized to a ranged from 50 micrometers (μm) to 300 μm. In the present embodiment, the width of each of the microlenses 150 is approximately 200 μm. As the microlenses 150 of the screen 15 have a hexagonal shape, the multiple microlenses 150 can be arrayed with high density.

Note that the shape of each of the microlenses 150 is not limited to a hexagonal shape. For example, in some embodiments, the microlenses 150 have a rectangular shape or a triangular shape. In the present embodiment, structure in which the multiple microlenses 150 are arrayed in a regularized manner is described. However, no limitation is intended thereby, and the arrangement of the microlenses 150 is not limited to this structure. For example, the centers of the multiple microlenses 150 may be decentered from each other, and the microlenses 150 may be arranged in an irregular manner. When such a decentered arrangement is adopted, those multiple microlenses 150 have different shapes from each other.

Alternatively, the height of the vertex in the optical-axis direction may be changed. When the decentering in the direction in which microlenses are arrayed or the shifting in the optical-axis direction is determined on a random basis, for example, the speckles that are caused by the interference of the laser beams that have passed through the boundary between each pair of neighboring microlenses and the moire that is caused by the cyclic array can be reduced.

The laser beams that have reached the screen 15 scan the inside of the microlenses 150, and multiple dots are marked as the laser beams are switched on and off during the scanning. For example, the levels of gradation can be expressed by a combination of on-off control of light. Alternatively, the levels of gradation may be expressed by adjusting the radiation intensity of the laser beams.

Figure 7A:
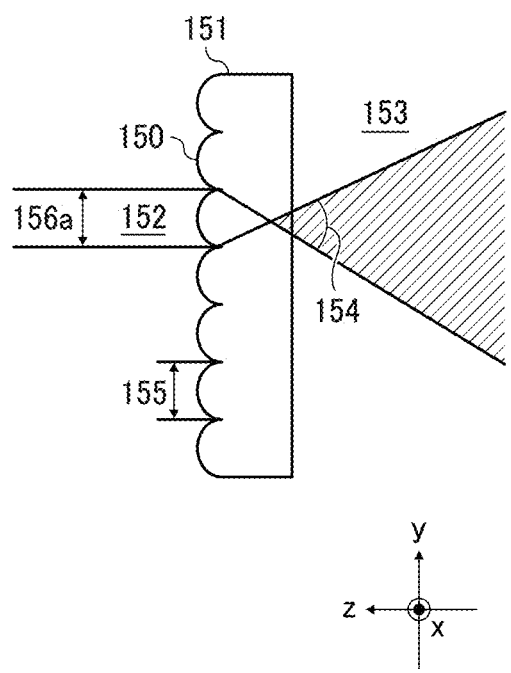
FIG. 7A and FIG. 7B are diagrams illustrating a difference in operation due to the differences in sizes of the diameter of incident light flux and the lens diameter in a microlens array, according to an embodiment of the present disclosure.
Figure 7B:
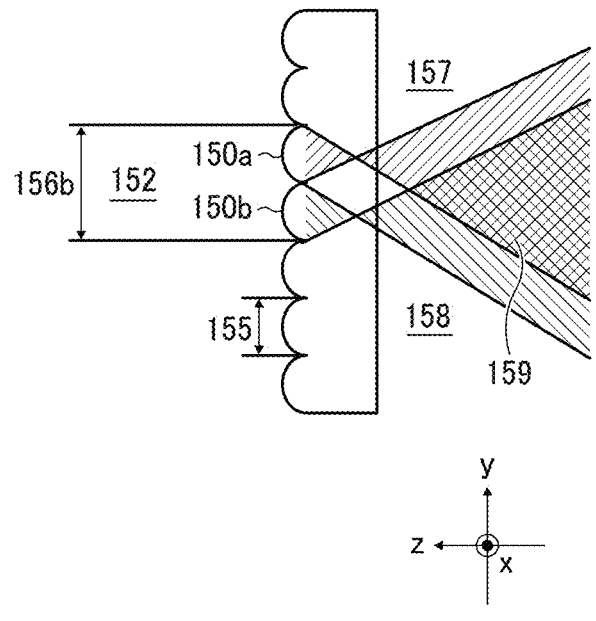

FIG. 7A and FIG. 7B are diagrams illustrating a difference in operation due to differences in sizes of the diameter of incident light flux and the lens diameter in the microlens array, according to the present embodiment.

As illustrated in FIG. 7A, the screen 15 is configured by an optical plate 151 in which the multiple microlenses 150 are neatly arranged. When an incident light 152 is scanned on the optical plate 151, the incident light 152 diverges as passing through the microlenses 150, and the incident light 152 becomes a diverging light 153. Due to the structure of the microlenses 150, the screen 15 can disperse the incident light 152 at a desired divergence angle 154. The intervals 155 at which the microlenses 150 are arranged is designed to be wider than the diameter 156a of the incident light 152. Accordingly, the screen 15 does not cause interference among the lenses, and does not cause speckles (speckle noise).

FIG. 7B is a diagram illustrating the optical paths of diverging lights when the diameter 156b of the incident light 152 is twice wider than the intervals 155 at which the microlenses 150 are arranged. The incident light 152 is incident on two microlenses 150a and 150b, and these two microlenses 150a and 150b produce two diverging lights 157 and 158, respectively. In such cases, lights may interfere with each other as two diverging lights exist in an area 159. Such an interference between two diverging lights (coherent light) is visually recognized as a speckle by an observer.

In view of the above circumstances, the intervals 155 at which the microlenses 150 are arranged is designed to be wider than the diameter 156 of the incident light 152 in order to reduce the speckles. A configuration with convex lenses are described as above with reference to FIG. 7A and FIG. 7B. However, no limitation is indicated thereby, and advantageous effects can be expected in a similar manner in a configuration with concave lenses.

As described above with reference to FIG. 6, FIG. 7A, and FIG. 7B, the screen 15 that is an example of an image forming unit serves as a divergent part through which the scanned laser beams diverge at a predetermined divergence angle. Due to this functionality, the driver (viewer) 3 can recognize an image in the range of the eye box. In other words, even when the driver (viewer) 3 who is seated on the driver's seat changes the positions of his/her eyes to some extent, his/her visually-recognizable range can be secured.

As described above, it is desired that the shape of each one of the microlenses 150 have a certain level of precision such that the light appropriately diverges through the screen 15 provided with the microlenses 150. Further, preferably, the screen 15 can be mass-produced. For this reason, for example, the screen 15 is molded by resin material. A concrete example of resin that satisfies the reflection property or optical property required for the microlenses 150 may include methacrylic resin, polyolefin resin, polycarbonate, and cyclic polyolefin resin. However, no limitation is intended thereby.

Figure 8:
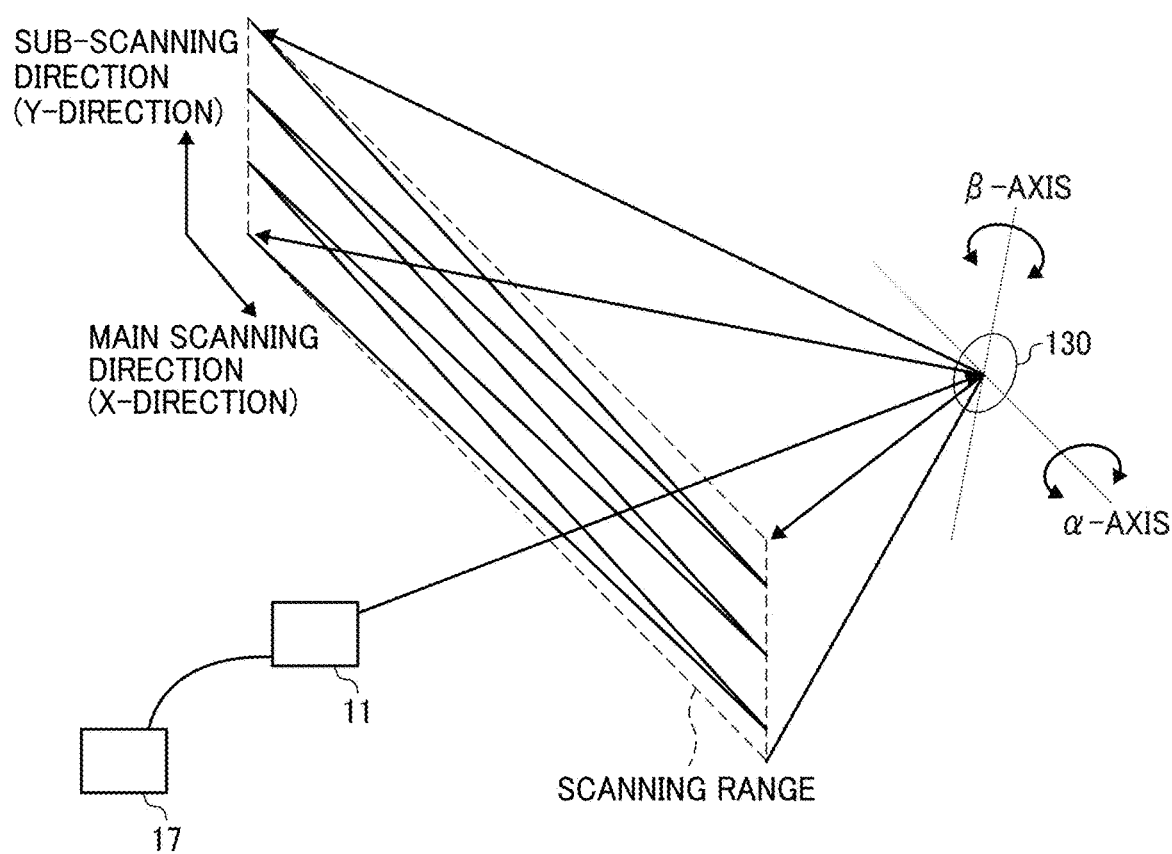
FIG. 8 is a diagram illustrating the relation between a mirror of a light deflector and the scanning range, according to an embodiment of the present disclosure.

FIG. 8 is a diagram illustrating the relation between the mirror 130 of the light deflector 13 and the scanning range, according to the present embodiment.

The FPGA 1001 controls the light-emission intensity, the timing of light emission, and the light waveform of the multiple light-source elements in the light-source device 11. The LD driver 1008 drives the multiple light-source elements of the light-source device 11 to emit laser beams. As illustrated in FIG. 8, the laser beams that are emitted from the multiple light-source elements and whose optical paths are combined are two-dimensionally deflected about the α axis and the β axis by the mirror 130 of the light deflector 13, and the screen 15 is irradiated with the laser beams deflected by the mirror 130, which serve as scanning beams. In other words, the screen 15 is two-dimensionally scanned by main scanning and sub-scanning by the light deflector 13.

In the present embodiment, the entire area to be scanned by the light deflector 13 may be referred to as a scanning range. The scanning beams scan (two-way scans) the scanning range of the screen 15 in an oscillating manner in the main scanning direction (X-axis direction) at a high frequency of about 20,000 to 40,000 hertz (Hz), and one-way scan the scanning range of the screen 15 in the sub-scanning direction (Y-axis direction) at a low frequency of about a few tens of Hz. In other words, the light deflector 13 performs raster scanning on the screen 15. In this configuration, the display device 100 controls the light emission of the multiple light-source elements according to the scanning position (the position of the scanning beam). Accordingly, an image can be drawn on a pixel-by-pixel basis and a virtual image can be displayed.

As described above, the sub-scanning cycle is about a few tens of Hz. Accordingly, the length of time to draw an image of one frame, i.e., the length of time to scan one frame (one cycle of two-dimensional scanning) is a few tens of millisecond (msec). For example, assuming that the main-scanning cycle and the sub-scanning cycle are 20,000 Hz and 50 Hz, respectively, the length of time to scan one frame is 20 msec.

Figure 9:
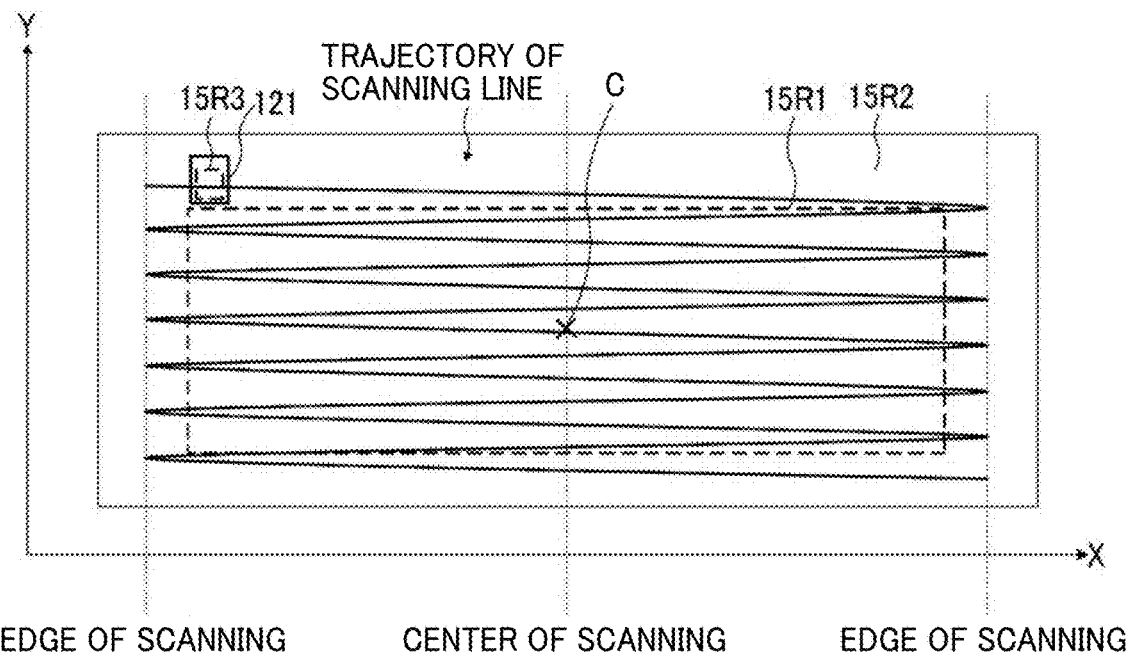
FIG. 9 is a diagram illustrating the trajectory of a scanning line when two-dimensional scanning is performed, according to an embodiment of the present disclosure.

FIG. 9 is a diagram illustrating the trajectory of a scanning line when two-dimensional scanning is performed, according to the present embodiment.

As illustrated in FIG. 9, the screen 15 includes an image area 15R1 (i.e., an effective scanning area) and a non-image area 15R2. The image area 15R1 is irradiated with the light that is modulated according to the image data, and an intermediate image is drawn on the image area 15R1. The non-image area 15R2 is a frame area that surrounds the image area 15R1. In FIG. 9, the center of the image area 15R1 is indicated by a reference sign "C."

In the present embodiment, the scanning range includes the image area 15R1 and a part of the non-image area 15R2 (i.e., a portion around the fringe of the image area 15R1) on the screen 15. In FIG. 9, the trajectory of the scanning line in the scanning range is indicated by a zigzag line. For the sake of explanatory convenience, the number of scanning lines in FIG. 9 is less than the actual number of scanning lines.

Further, the screen 15 includes a synchronous detection field 15R3 that includes a light receiver disposed at the edges of the image area 15R1 (a part of the non-image area 15R2) in the scanning range. In FIG. 9, the synchronous detection field 15R3 is disposed on the −X and +Y side of the image area 15R1. More specifically, the synchronous detection field 15R3 is disposed at a corner on the +Y side. For example, a signal that is detected by the photodetector 121, which is arranged at a position of the unit housing 12 to detect the scanning light incident on the synchronous detection field 15R3, is output to the field-programmable gate array (FPGA) 1001. The FPGA 1001 detects the operation of the light deflector 13 based on the timing at which the signal is received. Accordingly, the start timing of scanning or the end timing of scanning can be determined.

As described above, the screen 15 is configured by a transmissive optical element such as the microlens array that diffuses light. However, no limitation is intended thereby. In some embodiments, the screen 15 may be a reflective element such as a micromirror array that diffuses light, depending on the design or layout of the display device 100. Alternatively, in some embodiments, the screen 15 may be a flat plate or curved plate that does not diffuse light.

In the example case as illustrated in FIG. 9, the center of the screen 15 approximately matches a center C of an image area 15R1 (i.e., an effective scanning area) on which an intermediate image is drawn (that is irradiated with the light that is modulated according to the image data). In this case, it can also be said that the center C of the image area 15R1 approximately matches the center of the screen 15.

The shape of the screen 15 and the shape of the image area 15R1 are not limited to the shape as illustrated in FIG. 9. For example, in FIG. 9, the shape of the screen 15 is approximately similar to that of the image area 15R1, and the center of the screen 15 approximately matches the center of the image area 15R1. However, no limitation is intended thereby, and even when the shape of the screen 15 is approximately similar to that of the image area 15R1, and the center of the screen 15 may be displaced from the center of the image area 15R1. In other words, it is not necessary for the center of the screen 15 to match the center of the image area 15R1. Further, it is not necessary for the shape of the screen 15 to be similar to that of the image area 15R1. For example, when the screen 15 has a planar and rectangular shape, it is not necessary for the image area 15R1 to have a planar and rectangular shape. The image area 15R1 may have a curved surface. Alternatively, the image area 15R1 may have a rectangular or polygonal shape different from the rectangular shape of the screen 15.

For example, the shape of the image area 15R1 may be determined by the shape of a portion (i.e., a holder or the like) of the unit housing 12, as illustrated in FIG. 1, that holds the screen 15. In other words, when the screen 15 is held by the unit housing 12 or a holder of the screen 15, which is a part of the unit housing 12, so as to cover the non-image area 15R2, the light incident on the held portion is blocked by the unit housing 12 and the free-form surface mirror 30 is not irradiated with the light. As a result, the free-form surface mirror 30 is irradiated only with the diverging light of the intermediate image on the image area 15R1. As described above, the virtual image 45 of a desired shape is formed by determining the shape of the image area 15R1.

Figure 10:
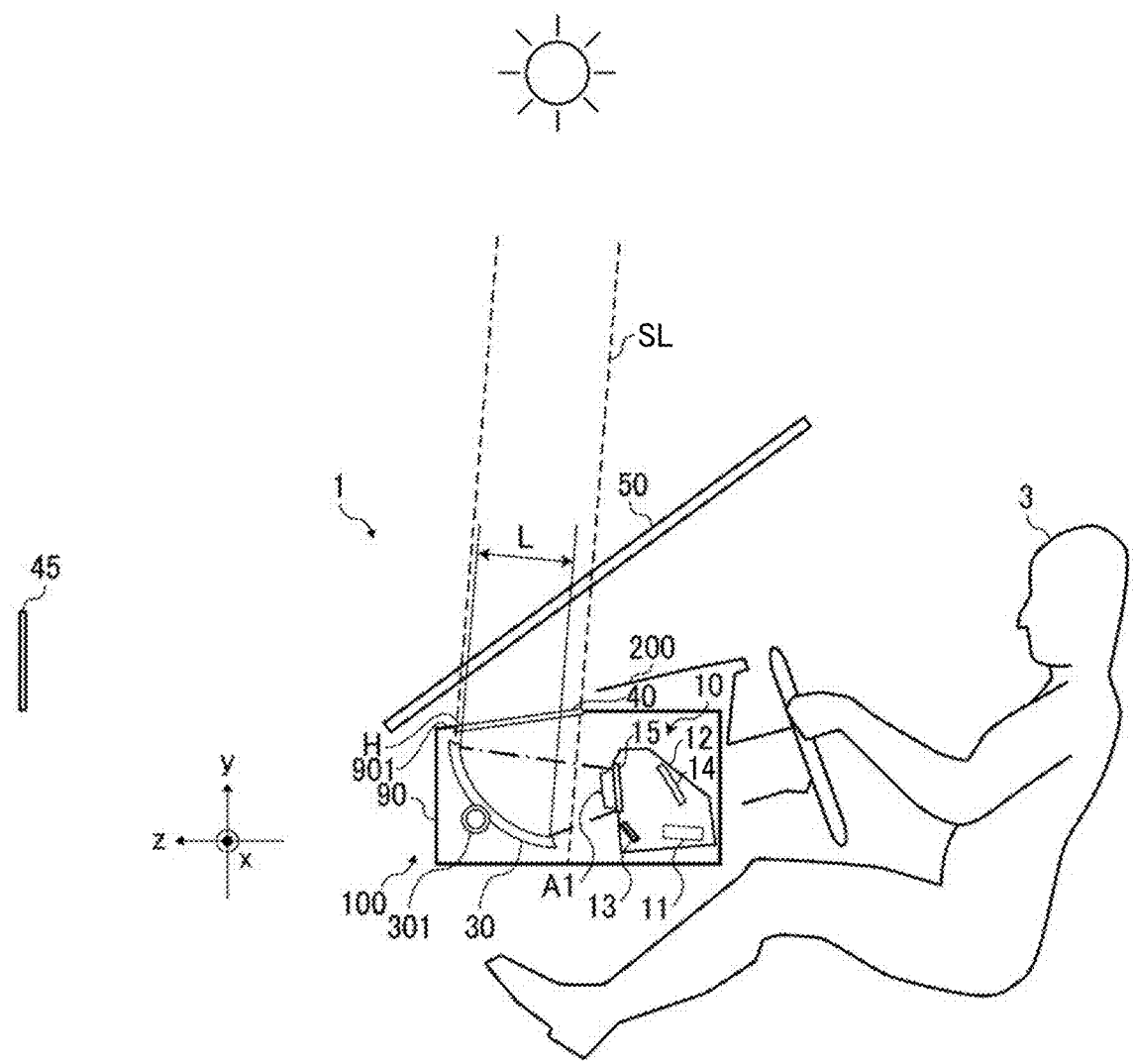
FIG. 10 is a diagram illustrating the extraneous light incident on a display device, according to an embodiment of the present disclosure.

FIG. 10 is a diagram illustrating the extraneous light incident on the display device 100, according to the present embodiment.

The display device 100 is provided for a mobile object such as a car. For this reason, the display device 100 is exposed to the extraneous light in many cases when in use. In the mobile object, the display device 100 displays the virtual image 45 that is superimposed on the outside view, i.e., the viewing field of the driver (viewer) 3. For this reason, in most cases, the display device 100 is arranged in an area in which the driver (viewer) 3 sees the outside view, i.e., an area around the front windshield 50 in the case of cars.

Accordingly, as illustrated in FIG. 10, the sunlight SL that has passed through the front windshield 50 passes through the dustproof window 40 and enters the display device 100. Then, out of the extraneous light that enters the display device 100, collimated light flux L that is incident on the free-form surface mirror 30 is concentrated by the free-form surface mirror 30, and travels along the same optical path as that of the projection light PL as illustrated in FIG. 1 in the opposite direction. Then, as indicated by dot-dash lines, the collimated light flux L reaches the screen 15.

As described above, in order to achieve the virtual image 45 with high brightness, high radiation intensity is desired for the projection light PL, that diverges through the screen 15 and is projected from the display device 100 via the free-form surface mirror 30. For this reason, a thin metal film such as of aluminum (Al) and silver (Ag), Which has high reflectivity, in particular, for the visible light included in the projection light PL, is formed by performing sputtering or vapor deposition on the free-form surface mirror 30 that is a reflective light-concentrating element.

For example, when another mirror is further arranged on the optical path between the screen 15 and the free-form surface mirror 30, that mirror is configured to have high reflectance for, at least, visible light. Accordingly, for example, the free-form surface mirror 30 or another mirror may have a high reflectance for the extraneous light such as the sunlight that has a wavelength distribution that is not included in the projection light PL (for example, ultraviolet light having a range of 300 nm and near-infrared light having a range exceeding 800 nm, up to 2500 nm).

In other words, in the display device 100, an optical system disposed on the optical path of the projection light PL is designed not to attenuate the light as much as possible. For this reason, the light flux L of the extraneous light that travels along the optical path in the inverse direction and passes through the free-form surface mirror 30 is barely attenuated by the optical elements along the way, and has a level of intensity as high as that of strong extraneous light such as the sunlight. As a result, an adverse effect may be caused inside the display device 100 by the radiant heat of the extraneous light. In particular, the width of the light flux that reaches the screen 15 is narrower than that of the light flux that is incident on the free-form surface mirror 30 due to the light-concentrating function of the free-form surface mirror 30. In other words, the screen 15 is irradiated with the light with a high level of irradiance, and thus high radiant heat is liberated on the screen 15. As a result, the functionality of the screen 15 may be adversely affected depending on the heat resistance property of the screen 15, and finally, the image that is displayed by the display device 100 may become defective. A configuration or structure to prevent such a defective condition due to the extraneous light that enters the display device 100 is described below.

Figure 11:
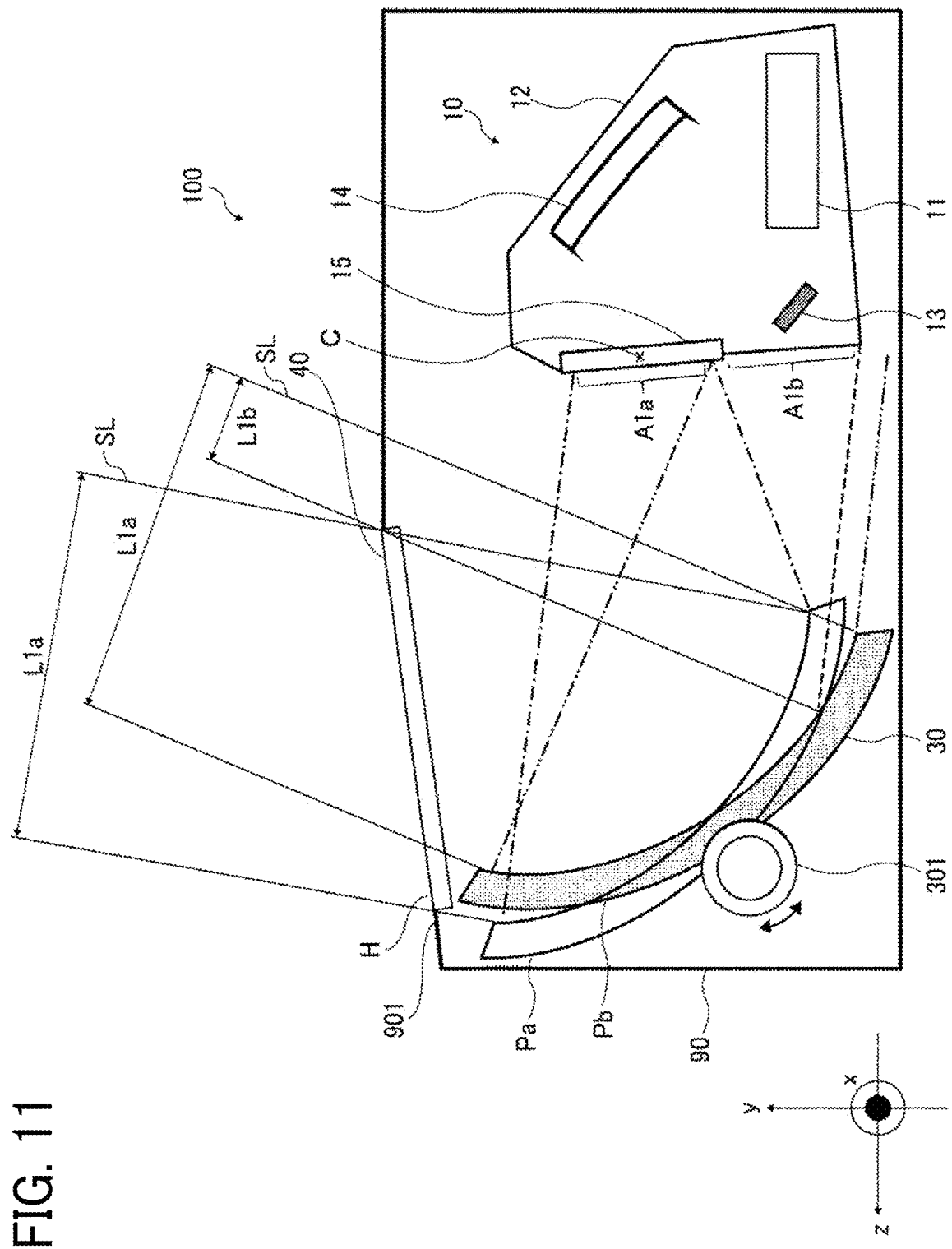
FIG. 11 is a diagram illustrating a configuration of a display device according to the first embodiment of the present disclosure.

FIG. 11 is a diagram illustrating a configuration of the display device 100 according to the first embodiment of the present disclosure.

FIG. 11 illustrates a state in which the image forming unit 10 is irradiated with the external light SL. Two different cases are illustrated in which the extraneous light is radiated to the image forming unit 10 when the free-form surface mirror 30 is at a position Pa and a position Pb. More specifically, in FIG. 11, A1$a$ denotes the reaching area in which the extraneous light radiated to the image forming unit 10 reaches the image forming unit 10 when the free-form surface mirror 30 is at the position Pa, and A1$b$ denotes the reaching area when the free-form surface mirror 30 is at the position Pb.

Firstly, the position Pa is described below. The position Pa is the position at which the free-form surface mirror 30 is arranged when the display device 100 is to form the virtual image 45. When the free-form surface mirror 30 is at the position Pa, the light flux L1$a$ of the sunlight SL is incident on the free-form surface mirror 30. Then, as indicated by the dot-dash lines in FIG. 11, the incident light flux L1$a$ is concentrated by the free-form surface mirror 30, and the reaching area A1$a$ of the screen 15 is irradiated with the light flux L1$a$.

In the first state in which the virtual image 45 is to be formed, each of the screen 15 and the free-form surface mirror 30 is arranged at a position that enables the light emitted from the screen 15 to be incident on the free-form surface mirror 30 in an efficient manner. Accordingly, the image area 15R1 (FIG. 9) is equivalent to the area that is irradiated with the extraneous light that travels along the optical path in the inverse direction, and the reaching area A1a approximately matches the image area 15R1. In the case of the example as illustrated in FIG. 9, the center of the area that is irradiated with the extraneous light, which travels from the free-form surface mirror 30 to the image forming unit 10, approximately matches the center of the screen 15 and the center C of the image area 15R1.

In the first state, the free-form surface mirror 30 has a certain degree of rotatable angle ranging between −3% to +3% to change the position at which the virtual image 45 is displayed according to the positions of the eyes of the viewer (driver) 3, as described above with reference to FIG. 1. Accordingly, in the first state, the area that is irradiated with the extraneous light approximately matches the image area 15R1 as long as the displacement between the area that is irradiated with the extraneous light and the image area 15R1 falls within the displacement due to the rotation within range of the rotatable angle in the first state.

Next, the position Pb is described below. For example, when the engine of the car is turned off and the virtual image 45 is not used by the display device 100, the free-form surface mirror 30 at the position Pa is rotated by an angle that exceeds the rotatable angle in the first state (that is, the rotatable angle ranging between −3% to +3%), and the position of the free-form surface mirror 30 is changed to the position Pb in a more inclined state than the position Pa with respect to a travel surface. For example, once the control unit 175 receives a commands for terminating the motor of a car from the vehicle-related information receiver 171 when the free-form surface mirror 30 is at the position Pa and in the first state, the control unit 175 generates a control signal to move the free-form surface mirror 30 to the position Pb.

As described above, the state of the display device 100 in which the virtual image 45 is not to be formed is referred to as the second state. In the second state, the area that is irradiated with the extraneous light is displaced from the image area 15R1. In other words, the area that is irradiated with the extraneous light does not match the image area 15R1. Accordingly, the reaching area A1$b$ is displaced from the image area 15R1. In other words, the reaching area A1$b$ does not match the image area 15R1. In the case of the example as illustrated in FIG. 9, the center of the area that is irradiated with the extraneous light, which travels from the free-form surface mirror 30 to the image forming unit 10, is displaced from the center of the screen 15 and the center C of the image area 15R1. In other words, the center of the area that is irradiated with the extraneous light, which travels from the free-form surface mirror 30 to the image forming unit 10, does not match the center of the screen 15 and the center C of the image area 15R1.

As illustrated in FIG. 11, light flux L1b of the light flux L1a, which is a part of the extraneous light to be incident on the free-form surface mirror 30, is blocked by the hole surrounding area 901 of the housing 90. Due to such a configuration, the irradiation light that propagates from the free-form surface mirror 30 in the opposite direction with respect to the projected image and is radiated to the image forming unit 10 is the light flux that reaches the reaching area A1b whose range is indicated between the broken line and the two-dot chain line that is drawn on the upper side of the broken line in FIG. 11.

As described above, the display device 100 is provided with the free-form surface mirror 30 including at least one mirror. In this configuration, the free-form surface mirror 30 serves as an imaging optical system, and the inclination of the free-form surface mirror 30 differs between the first state and the second state. Moreover, the light flux of the extraneous light radiated on the reflection plane 30S of the free-form surface mirror 30 is wider when the free-form surface mirror 30 is in the first state than when the free-form surface mirror 30 is in the second state as the width of the light flux is L1a in the first state and the width of the light flux is partly blocked by the hole surrounding area 901 and is reduced by L1b in the second state compared with L1a. In other words, the light flux of the extraneous light incident on the display device 100 is smaller when the free-form surface mirror 30 is in the first state than when the free-form surface mirror 30 is in the second state, and the adverse effect on the elements arranged inside the display device 100 such as the image forming unit 10 and the screen 15, which is caused by the radiant heat of the extraneous light, can be reduced.

In the present embodiment, when the light flux of the extraneous light that is radiated on the reflection plane 30S of the free-form surface mirror 30 changes, the area of the reflection plane 30S of the free-form surface mirror 30 when viewed from the outside of the housing 90 through the hole H changes. In other words, the project area of the reflection plane 30S of the free-form surface mirror 30, which is projected to the outside of the housing 90 through the hole H, changes.

Due to such a configuration, in the display device 100, the inclination of the reflection plane 30S is changed so as to reduce the project area of the reflection plane 30S, which is projected to the outside of the housing 90 through the hole H on the housing 90. By so doing, the light flux of the extraneous light that is radiated and reflected by the reflection plane 30S and then enters inside the housing 90 can be reduced. Due to this configuration, the adverse effect which is caused by the radiant heat of the extraneous light can be reduced inside the housing 90.

FIG. 12 is a diagram illustrating the project area of the reflection plane 30S of the free-form surface mirror 30, according to the present embodiment.

The project area of the reflection plane 30S corresponds to the area of the reflection plane 30S formed when only the reflection plane 30S of the free-form surface mirror 30 is irradiated with collimated light flux, and is typically maximized when the collimated light flux is radiated to the front of the reflection plane 30S.

In the present embodiment, the largest value for the project area of the reflection plane 30S, which is projected to the outside of the housing 90 through the hole H, i.e., the maximum value of the area of the reflection plane 30S of the free-form surface mirror 30 when viewed from the outside of the housing 90 through the hole H, varies according to the dimension of the hole H and the relative angle that the hole H forms with the reflection plane 30S.

As illustrated in FIG. 12, Lpa indicates the largest value for the project area of the reflection plane 30S, which is projected to the outside of the housing 90 through the hole H, when the free-form surface mirror 30 is at the position Pa, and Lpb indicates the largest value for the project area of the reflection plane 30S, which is projected to the outside of the housing 90 through the hole H, when the free-form surface mirror 30 is at the position Pb.

Moreover, the largest value Lpb of the project area of the reflection plane 30S, which is projected to the outside of the housing 90 through the hole when the free-form surface mirror 30 is at the position Pb is smaller than the largest value Lpa of the project area of the reflection plane 30S, which is projected to the outside of the housing 90 through the hole H, when the free-form surface mirror 30 is at the position Pa.

In the present embodiment, the largest value Lpb of the project area of the reflection plane 30S of the free-form surface mirror 30, which is projected to the outside of the housing 90 through the hole H, corresponds to the largest value for the light flux of the extraneous light radiated on the reflection plane 30S of the free-form surface mirror 30. For this reason, the largest value for the light flux of the extraneous light radiated on the reflection plane 30S when the free-form surface mirror 30 is at the position Pb is smaller than the largest value for the light flux of the extraneous light radiated on the reflection plane 30S when the free-form surface mirror 30 is at the position Pa.

In the present embodiment, cases in the second state are described in which the light flux as indicated by L1b in FIG. 11 is blocked by the housing 90 that includes the hole H and does not enter the display device 100. However, even when the free-form surface mirror 30 is at the position Pb, in some cases when the hole H is wider, all the light flux Lia may enter the display device 100. Even in such cases, when the second state is adopted and the optical path is changed so as not to form a virtual image, the center of the reaching area A1a in which the extraneous light reaches the image forming unit 10 is displaced from the center C of the image area 15R1 on the screen 15. As a result, the amount of the extraneous light that is to be radiated to the screen 15 decreases, and the possibility in which the screen 15 malfunctions or is damaged by the heat due to the radiated extraneous light is reduced. As described above, the intensity of the irradiation light of the extraneous light towards the image forming unit 10 can be adjusted to a desired degree by adopting the position of the imaging optical system in the second state as illustrated in FIG. 11.

The degree of the irradiation light of the extraneous light towards the image forming unit 10 is discussed below. As illustrated in FIG. 11, when the area that is irradiated with the extraneous light is displaced from the center C of the image area 15R1, the extraneous light is concentrated around the screen 15 of the image forming unit 10. In view of such concentration of light, for example, when the image forming unit 10 is irradiated with the extraneous light that is displaced from the center C of the image area 15R1 for a longer time, the temperature of the image forming unit 10 may significantly increase, and the screen 15 may be affected by the propagated heat. In order to handle such a situation, in the second state, the extraneous light incident on the display device 100 may completely be blocked as the free-form surface mirror 30 is rotated to reach an angle with which no extraneous light is incident on the display device 100.

However, in such a configuration, large space is required to rotate the free-form surface mirror 30, and the display device 100 increases in size. Moreover, it takes a long time for the free-form surface mirror 30 to rotate in order to return to the first state from the second state, and the length of time a user has to wait until the display device 100 displays the virtual image 45 again after the free-form surface mirror 30 gets into the second state increases. In other words, the adverse effect due to the extraneous light cannot appropriately be controlled by completely blocking the extraneous light when the virtual image 45 is not to be formed.

As discussed above, preferably, the rise in temperature on the screen 15 caused by the extraneous light that enters the display device 100 is appropriately controlled to a range where the screen 15 is not adversely affected. In order to determine such a range of temperature rise, firstly, when the temperature on the screen 15 increases due to the radiant heat of the extraneous light in the display device 100, a factor in increasing the adverse effect on the screen 15 is discussed below.

For example, the temperature at the position where the display device 100 is disposed is a factor in increasing the adverse effect on the screen 15 due to the radiant heat of the extraneous light. The temperature of the screen 15 increases due to the temperature at the position where the display device 100 is disposed. In other words, in the case of cars, the temperature of the screen 15 increases due to the temperature equivalent to the in-car temperature or the temperature of the dashboard 200 or the like. When the driver stays inside the car, the in-car temperature of the car provided with the display device 100 is equivalent to the room temperature. Accordingly, the temperature of the screen 15 does not reach a significantly high temperature even if the in-car temperature is increased by the extraneous light that reaches the screen 15. By contrast, when the car is parked and left by the driver, the in-car temperature increases and the temperature of the screen 15 may get so high even if the rise in temperature due to the extraneous light is not significantly large.

As a specific condition in which the temperature significantly increases at the position where the display device 100 is disposed, for example, it is known in the art that the temperature of the dashboard 200 increases to about 90° C. when the radiation intensity of extraneous light is 1100 W/m$^2$. The radiation intensity of extraneous light reaches 1100 W/m$^2$ by the sunlight AM 1.0 right on the equator, as defined in IEC 60904-3.

For example, the material that is used for the screen 15 is another factor in increasing the adverse effect on the screen 15 due to the radiant heat of the extraneous light. When the temperature of the screen 15 gets high, the degree of influence on the screen 15 differs depending on the materials of the screen 15. As described above, when the material of the screen 15 is resin that satisfies the reflection property or optical property required for a divergent part, the resin material has a low thermal conductivity compared with, for example, a glass material, and the temperature that is increased due to the extraneous light cannot quickly be diffused. Moreover, the heat resistance of a resin material is as low as 120 to several hundred degrees Celsius ° C. compared with the optical glass whose softening point is as high as 700 to 1400 degrees Celsius ° C. For this reason, depending on the material used for the screen 15, the resin that is adopted as the material of the screen 15 may reach a temperature that leads to a defective condition.

In some embodiments, the surface of the resin material of the screen 15 may be coated with, for example, an antireflection film. If the high temperature condition continues for a long time due to the difference in coefficient of thermal expansion between the resin material and the material used for surface treatment, for example, the screen 15 may become defective as cracked at about 120 to 150 degrees Celsius ° C.

As described above, when there are multiple factors, for example, when the temperature at the position where the display device 100 is disposed increases to high temperature and resin is used as the material for the screen 15, the screen 15 is adversely affected easily. In view of such a situation with multiple factors, i.e., in view of a situation in which the temperature of the dashboard 200 increases to about 90° C. as described above and the heat resistance property of the screen 15 that is made of resin material, the allowable rise in temperature ΔT on the screen 15 is 30° C. In further view of the security, the allowable rise in temperature ΔT on the screen 15 is about 15° C. Conditions for achieving such allowable rise in temperature on the screen 15 of the display device 100 are discussed below.

Figure 13:
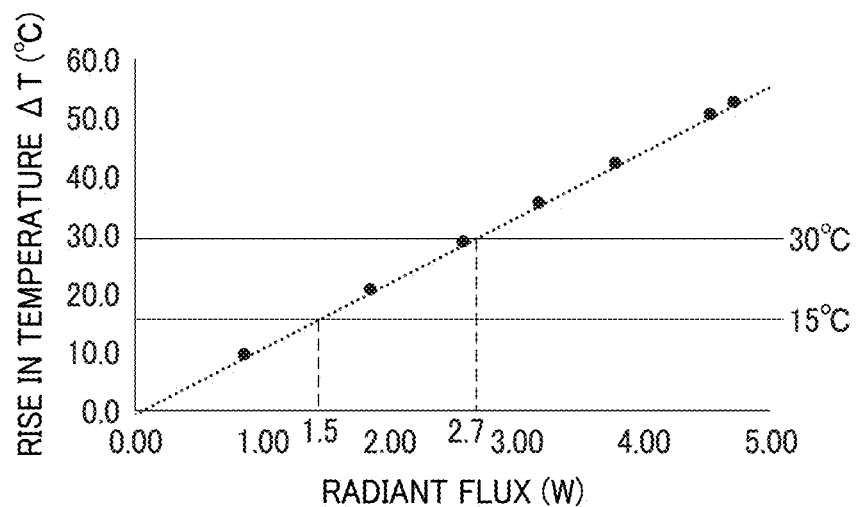
FIG. 13 is a graph illustrating the relation between the radiant flux of the irradiation light of the extraneous light towards an image forming unit and the rise in temperature on an image forming unit, according to an embodiment of the present disclosure.

FIG. 13 is a graph illustrating the relation between the radiant flux of the irradiation light of the extraneous light towards the image forming unit 10 and the rise in temperature on an image forming unit, according to the present embodiment.

The horizontal axis indicates the radiant flux (W) of the extraneous light radiated to the image forming unit 10, and the vertical axis indicates the rise in temperature (° C.) on the screen 15.

In order to draw the relation as illustrated in FIG. 13, the radiant flux of the extraneous light radiated to the image forming unit 10, which is based on an assumption that the radiation intensity of extraneous light is 1100 W/m$^2$ as of the sunlight as described above, is calculated according to the area of the free-form surface mirror 30 irradiated with the extraneous light and the transmittance and the reflectance ratio of the multiple optical systems through which the extraneous light passes to reach the screen 15.

In actuality, the area of the free-form surface mirror 30 that is irradiated with the extraneous light varies according to the angle that the extraneous light forms with the display device 100. However, in the above calculation, it is assumed that, with that angle, the area of the free-form surface mirror 30 is maximized in appearance. The expression "in appearance" is based on the assumption that the free-form surface mirror 30 is viewed from the light source, i.e., the sun in the case of extraneous light.

The rise in temperature on the screen 15 is calculated according to the measurement or simulation that is performed for different levels of radiant flux. As a result, the relation between the radiant flux of the irradiation light towards the image forming unit 10 and the rise in temperature ΔT on the screen 15 with that radiant flux is obtained as illustrated in FIG. 13. In other words, the rise in temperature ΔT on the screen 15 is proportionate to an increasing level of radiant flux regardless of, for example, the irradiation field and the magnification power of light collection, as illustrated in FIG. 13.

As illustrated in FIG. 13, when the rise in temperature ΔT is 30° C., the radiant flux towards the image forming unit 10 is 2.7 W. Accordingly, as long as the radiant flux is less than 2.7 W, the screen 15 works with no functional decline or damage. As illustrated in FIG. 13, the radiant flux is 1.5 W when the ΔT is 15° C., and the level of security further increases when the radiant flux is less than 1.5 W.

As described above with reference to FIG. 11, the radiation intensity of the irradiation light of the extraneous light towards the image forming unit 10 can be adjusted by changing the position of the imaging optical system in the second state. For example, the radiant flux can be adjusted by changing the position of the imaging optical system in the second state. Assuming that the extraneous light with the irradiance of 1100 W/m² is radiated, the adverse effect due to the extraneous light can appropriately be controlled when the position of the imaging optical system in the second state is determined such that the radiant flux becomes less than 2.7 W. More preferably, the radiant flux is controlled to be less than 1.5 W.

An example of a method of measuring the radiant flux of the irradiation light radiated to the image forming unit 10 is described below. When, for example, the area of the free-form surface mirror 30 irradiated with the extraneous light and the transmittance and the reflectance ratio of the multiple optical systems through which the extraneous light passes to reach the screen 15, as described above, are not used, the radiant flux of the irradiation light radiated to the image forming unit 10 can be measured as follows.

Firstly, the light with the irradiance B (W/m²) enters the display device 100 through the hole surrounding area 901 with an angle where the area of the free-form surface mirror 30 is maximized in appearance, using the SEW solar simulator XIM-3B300KP for evaluating solar cells. In this measurement, the light that is emitted from the above solar simulator enters the display device 100 without passing through the front windshield 50. Then, a sensor probe of the SATOTECH actinograph solar power meter SPM-SD is fixed to a portion of the image forming unit 10 irradiated with the light, in order to measure the irradiance B' (W/m²) at that portion.

Next, the irradiated area A (m²) on the image forming unit 10 is calculated. The irradiated area A (m²) is calculated by measuring the area on the image forming unit 10 irradiated with the light emitted from the above solar simulator. For example, the area may be measured by directly measuring the size of the area on the image forming unit 10 irradiated with the light with a measuring instrument such as a scale or calculating the size of the irradiated area based on the images captured by a camera.

For example, when the irradiation field is the image area 15R1 on the screen 15 of the image forming unit 10, the area of the image area 15R1 is measured. In the case of the second state, the irradiated area on the screen 15 is measured, and the irradiated area on the image forming unit 10 from which the irradiated area on the screen 15 is excluded is measured. Then, these two areas are summed up.

the radiant flux towards the image forming unit 10 when that the light with the irradiance of 1100 W/m² is radiated can be calculated from the measured and obtained values according to the following equation.

$$\Phi=1100 \times A \times (B'/B))$$

Φ: Radiant flux (W) of irradiation light towards image forming unit

A: Area of image forming unit irradiated with light (m²)

B: Radiation intensity (W/m²) of irradiation light towards display device

B': Radiation intensity (W/m²) of irradiation light incident on irradiation position of image forming unit In the above equation, "radiation intensity B' (W/m²)/radiation intensity B (W/m²)" indicates the decay rate at which the light that enters the display device 100 through the hole surrounding area 901 decays before reaching the image forming unit 10. For example, when the decay rate significantly varies depending on the position of the image forming unit 10 irradiated with the extraneous light due to, for example, the shape of the image forming unit 10, the radiant flux at several positions of the image forming unit 10 may be calculated according to the above equation, and the results of calculations may be summed up as the radiant flux towards the entirety of the image forming unit 10.

Figure 14:
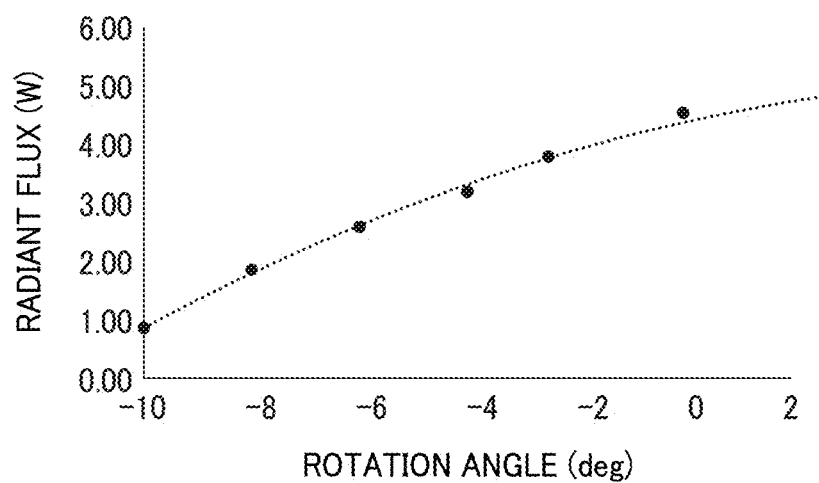
FIG. 14 is a graph illustrating the relation between the rotation angle of a mirror provided for an imaging optical system and the radiant flux of the irradiation light of the extraneous light towards an image forming unit, according to an embodiment of the present disclosure.

FIG. 14 is a graph illustrating the relation between the rotation angle of a mirror provided for the imaging optical system and the radiant flux of the irradiation light of the extraneous light towards the image forming unit 10, according to the present embodiment.

In FIG. 14, the horizontal axis indicates the rotation angle of the free-form surface mirror 30, and the vertical axis indicates the radiant flux radiated to the image forming unit 10. Regarding the rotation angle of the mirror, which is indicated by the horizontal axis of the graph in FIG. 14, the minus values indicate the direction in which the free-form surface mirror 30 stands in FIG. 11. In other words, the minus values indicate the rotation in the direction where the free-form surface mirror 30 gets close to the parallel condition with respect to the Y-axis.

The angle of the extraneous light when the area of the free-form surface mirror 30 is maximized in appearance changes according to the rotation of the free-form surface mirror 30. In such a configuration, the hole surrounding area 901 on the display device 100 is fixed, and thus as illustrated in FIG. 11, the extraneous light that is incident on the display device 100 is blocked by the hole surrounding area 901. In other words, the area of the free-form surface mirror 30 irradiated with the extraneous light decreases, and as a result, the radiant flux that reaches the screen 15 also decreases in volume.

According to the experiments, the radiant flux of the extraneous light radiated to the image forming unit 10 correlates with the rise in temperature ΔT on the screen 15 as illustrated in FIG. 14. Thus, the screen 15 can work appropriately when the free-form surface mirror 30 is rotated with reference to FIG. 14 to have an angle such that the radiant flux radiated to the image forming unit 10 becomes less than 2.7 W.

As described above, a concrete example of resin that satisfies the reflection property or optical property required for the screen 15 includes methacrylic resin, polyolefin resin, polycarbonate, and cyclic polyolefin resin, and the heat resistance of such resin is about 120 to 150° C. By contrast, as known in the art, the unit housing 12 around the screen 15 is made of a resin component such as polybutylene terephthalate and polypropylene carbonate, and the heat resistance of such a resin component is about 240 degrees Celsius ° C., which is higher than the heat resistance of the resin used for the screen 15.

Due to this configuration, even if the free-form surface mirror 30 is rotated to prevent the screen 15 from being irradiated with the extraneous light and the area around the screen 15 of the unit housing 12 is irradiated with the extraneous light, there is little likelihood that the unit housing 12 is damaged by the radiant flux that does not damage the screen 15.

As described above, the incident light is partly blocked by the hole surrounding area 901 as the free-form surface mirror 30 is rotated, and the radiant flux decreases. Further, the adverse effect on the screen 15 due to the heat is reduced as the free-form surface mirror 30 is rotated and the area that is irradiated with the extraneous light is displaced from and does not match the image area 15R1.

As a concrete example of the rotatable angle of the free-form surface mirror 30, the rotatable angle in the first state is within 6 degrees ranging from −3° to 3°, and the rotatable angle in the second state is within 13 degrees ranging from −10° to 3°. As described above, the range of the rotatable angle is set greater for the first state than the second state. Accordingly, the effects on the inside of the display device 100, which is caused by the extraneous light, can be controlled.

If the rotatable angle in the first state ranges from −10° to 3° in a similar manner to the second state, the position at which the virtual image 45 is formed moves in a dynamic manner, and thus the user has to adjust the position at which the virtual image 45 is formed in a greater range. As described above, the customer convenience of a user can be improved by limiting the rotatable angle and the movable range in the first state than that of the second state.

Figure 15:
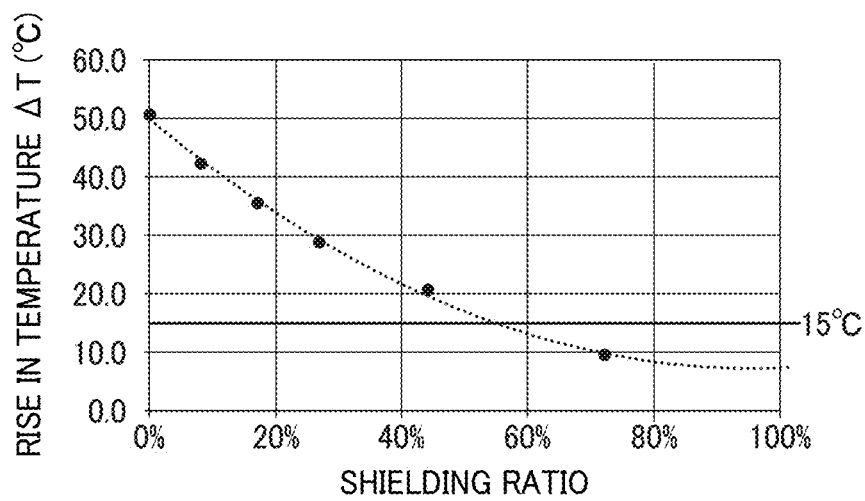
FIG. 15 is a graph illustrating the relation between the shielding ratio of extraneous light and the rise in temperature on an image forming unit, according to an embodiment of the present disclosure.

FIG. 15 is a graph illustrating the relation between the shielding ratio of the extraneous light and the rise in temperature on the screen 15.

According to the experiments, assuming that the rate at which the area of the free-form surface mirror 30 irradiated with the extraneous light decreases due to the blockage by the hole surrounding area 901 is the shielding ratio, the relation between the shielding ratio of the extraneous light and the rise in temperature on the screen 15 is obtained as illustrated in FIG. 15.

The relation between the operation of the free-form surface mirror 30 and the shielding ratio is described below. The angle of the sunlight when the area of the free-form surface mirror 30 is maximized in appearance varies according to the rotation of the free-form surface mirror 30. When the illuminance of the sunlight does not change and the shape of the hole surrounding area 901, i.e., the size of the hole H, is fixed, the area of the free-form surface mirror 30 that is irradiated with the extraneous light decreases in proportionate to the amount of the extraneous light that is blocked by the hole surrounding area 901. As a result, the irradiation light that reaches the image forming unit 10 decreases. As illustrated in FIG. 15, when the free-form surface mirror rotates and the light-shielding ratio increases, the rise in temperature ΔT decreases.

Assuming that no extraneous light entering the housing 90 is blocked by the hole surrounding area 901 and the entire surface of the free-form surface mirror 30 is irradiated with the extraneous light, i.e., when the shielding ratio is 0%, the radiant flux of the irradiation light that reaches the image forming unit 10 is 5 W, and as illustrated in FIG. 15, the rise in temperature ΔT on the screen 15 reaches almost 50° C.

By contrast, as illustrated in FIG. 15, when the shielding ratio is equal to or higher than 25%, the rise in temperature ΔT runs below 30° C., and the screen 15 works with no functional decline or damage. When the shielding ratio is equal to or higher than 60%, the rise in temperature ΔT runs below 15° C., and the level of security further increases.

Figure 16:
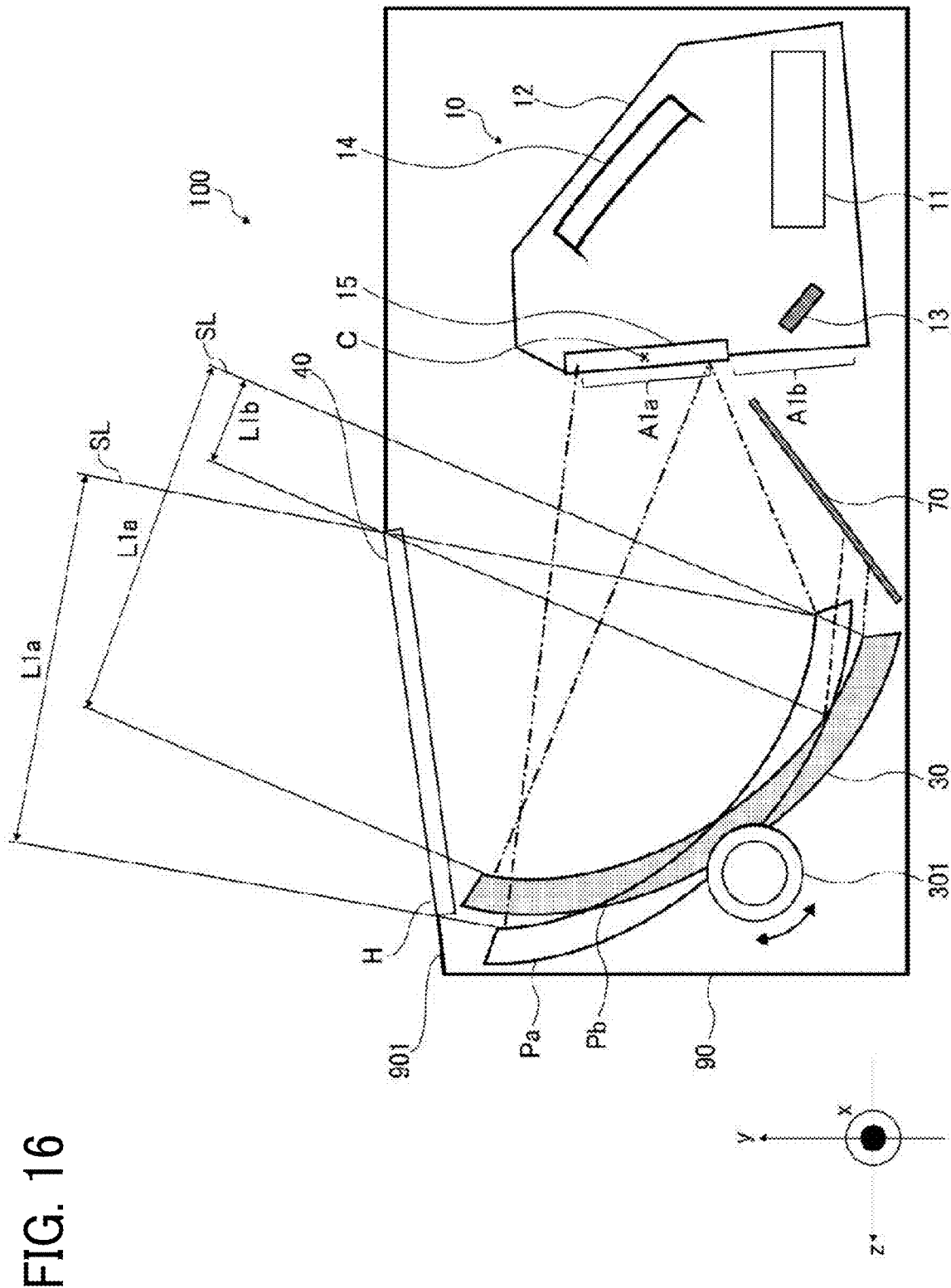
FIG. 16 is a diagram illustrating a configuration of a display device according to a second embodiment of the present disclosure.

FIG. 16 is a diagram illustrating a configuration of the display device 100 according to a second embodiment of the present disclosure.

The configuration or operation of the second embodiment of the present disclosure is similar to that of the first embodiment of the present disclosure. In particular, the first and second embodiments of the present disclosure have the configuration or operation in FIG. 1 to FIG. 10 and FIG. 12 to FIG. 15 in common, and the overlapping description is omitted. As illustrated in FIG. 16, in the second embodiment of the present disclosure, a light-shielding plate 70 that serves as an example of a light-shielding member is added to the configuration of FIG. 11.

The light-shielding plate 70 is arranged at the front of the image forming unit 10 on the optical paths in which the image forming unit 10 is irradiated with the extraneous light. Note also that the light-shielding plate 70 is disposed so as not to block the optical path to the screen 15 at least when the display device 100 is in the first state.

As described above, according to the present embodiment, the light-shielding plate 70 is disposed near the image forming unit 10 such that the extraneous light that is radiated to the image forming unit 10 is blocked. As a result, the radiant flux towards the image forming unit 10 can be reduced to, for example, less than 2.7 watts (W).

Figure 17:
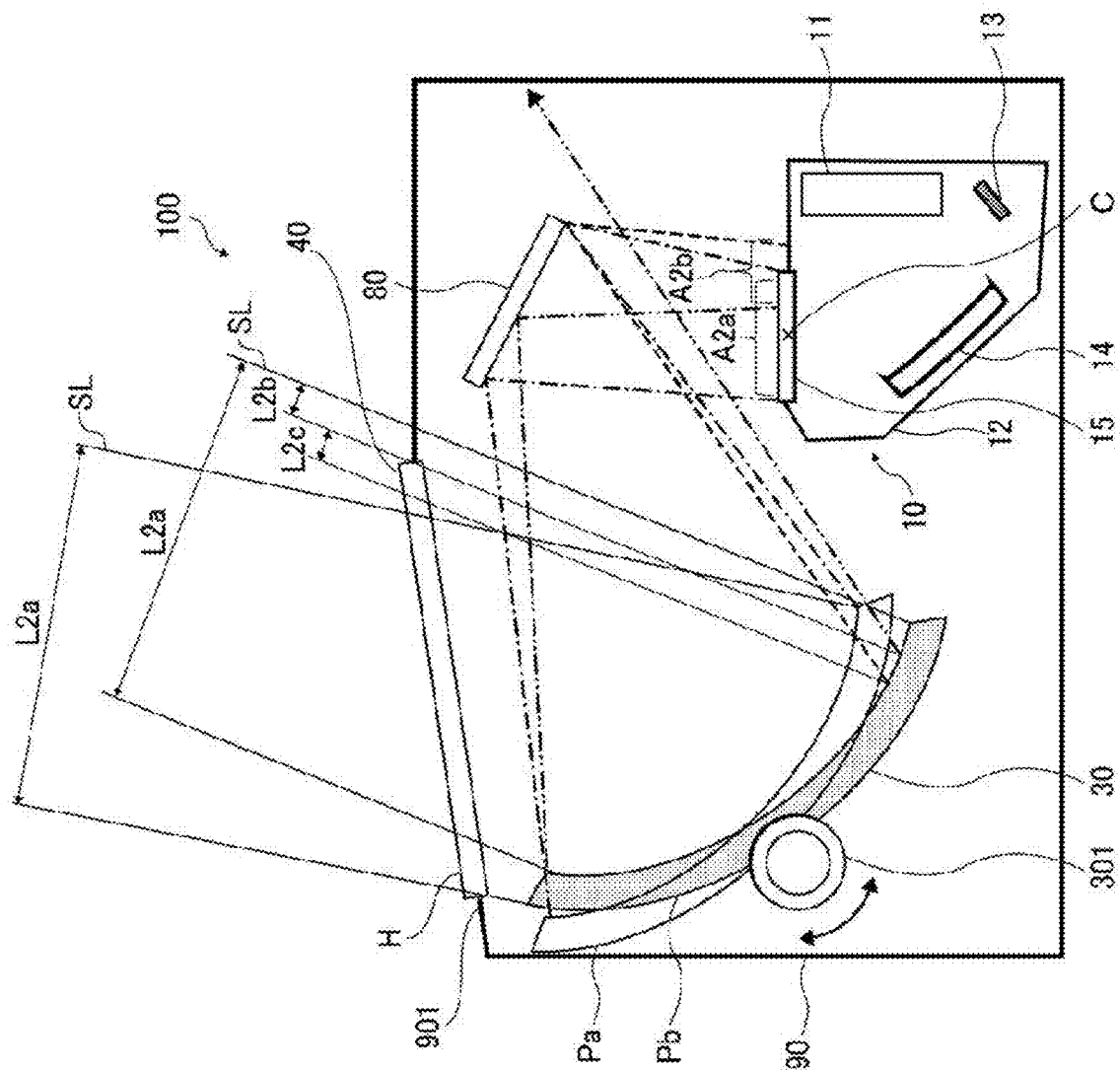
FIG. 17 is a diagram illustrating a configuration of a display device according to a third embodiment of the present disclosure.

FIG. 17 is a diagram illustrating a configuration of the display device 100 according to a third embodiment of the present disclosure.

The configuration or operation of the third embodiment of the present disclosure is similar to that of the first embodiment of the present disclosure. In particular, the first and second embodiments of the present disclosure have the configuration or operation in FIG. 1 to FIG. 10 and FIG. 12 to FIG. 15 in common, and the overlapping description is omitted. In addition to the configuration of FIG. 11, a mirror 80 that serves as an example of an optical system and reflection optical system is further arranged on the optical path between the screen 15 and the free-form surface mirror 30.

Firstly, the first state is described below. In the first state, the display device 100 forms the virtual image 45, and the free-form surface mirror 30 is at the position Pa. In this drawing, L2a denotes the light flux of the extraneous light SL that is incident on the free-form surface mirror 30.

As indicated by dot-dash lines, the light flux L2a is reflected by the free-form surface mirror 30, and enters the mirror 80. As indicated by dot-dash lines, the light flux that is incident on the mirror 80 is incident on the screen 15 as the irradiation light towards the image forming unit 10. The center of the reached area A1a in which the extraneous light reaches the image forming unit 10 approximately matches the center C of the image area 15R1.

In the example as described above with reference to FIG. 1, the free-form surface mirror 30 in the first state has a certain degree of rotatable angle ranging between −3% to +3%. Accordingly, it can be assumed that the area that is irradiated with the extraneous light approximately matches the center C of the image area 15R1 as long as the displacement falls within the displacement due to the rotation within range of the rotatable angle in the first state.

Secondly, the second state is described below. In the second state, the display device 100 does not form the virtual image 45, and the free-form surface mirror 30 is at the position Pb, which moved from the position Pa by rotation. First of all, in a similar manner to the first embodiment, the extraneous light is blocked by the hole surrounding area 901. In FIG. 17, L2b denotes the blocked light flux, and the image area 15R1 is not irradiated with the light flux L2b. As a result, out of the light flux L2a of the extraneous light, only the light flux that is indicated by a pair of two-dot chain lines in FIG. 17 is incident on the free-form surface mirror 30 and is reflected.

The mirror 80 is arranged such that the light reflected by the free-form surface mirror 30 in the first state is incident on the image area 15R1 on the screen 15. For this reason, in the second state where the position of the free-form surface mirror 30 is changed with respect to the first state, the angle of incidence that the light flux reflected by the free-form surface mirror 30 forms with the mirror 80 changes. Accordingly, unlike the first state, some of the light flux that is reflected by the free-form surface mirror 30 is not incident on the mirror 80. Out of the light flux indicated between a pair of the two-dot chain lines in FIG. 16, only the light flux between the broken line and the two-dot chain line that is drawn on the upper side of the broken line in FIG. 16 serves as the irradiation light that is incident on the mirror 80 and then is reflected by the mirror 80 towards the image forming unit 10. By contrast, the light flux between the broken line and the two-dot chain line that is drawn on the lower side of the broken line in FIG. 16 is not incident on the mirror 80. In other words, some of the extraneous light that is indicated by L2c is not incident on the mirror 80, and thus the image area 15R1 is not irradiated with the light flux L2c.

In the present embodiment, changes in the light flux of the extraneous light radiated on the reflection plane 30S of the free-form surface mirror 30 relate to changes in the project area of the reflection plane 30S of the free-form surface mirror 30, which is projected to the outside of the housing 90 through the hole H.

In other words, in the display device 100, when the inclination of the reflection plane 30S is changed so as to reduce the project area of the reflection plane 30S, which is projected to the outside of the housing 90 through the hole H on the housing 90, the area of the mirror 80 that is irradiated with the extraneous light that enters the housing 90 through the hole H and then is reflected by the reflection plane 30S can be reduced.

Due to such a configuration, the adverse effect on the image forming unit 10 and the screen 15, which is caused by the radiant heat of the extraneous light reflected by the mirror 80, can be reduced.

Alternatively, when a transmissive optical system is provided in place of the mirror 80, in a similar manner, the adverse effect on the image forming unit 10 and the screen 15, which is caused by the radiant heat of the extraneous light that passes through a transmissive optical system, can be reduced by reducing the area of the transmissive optical system that is irradiated with the light.

Figure 18:
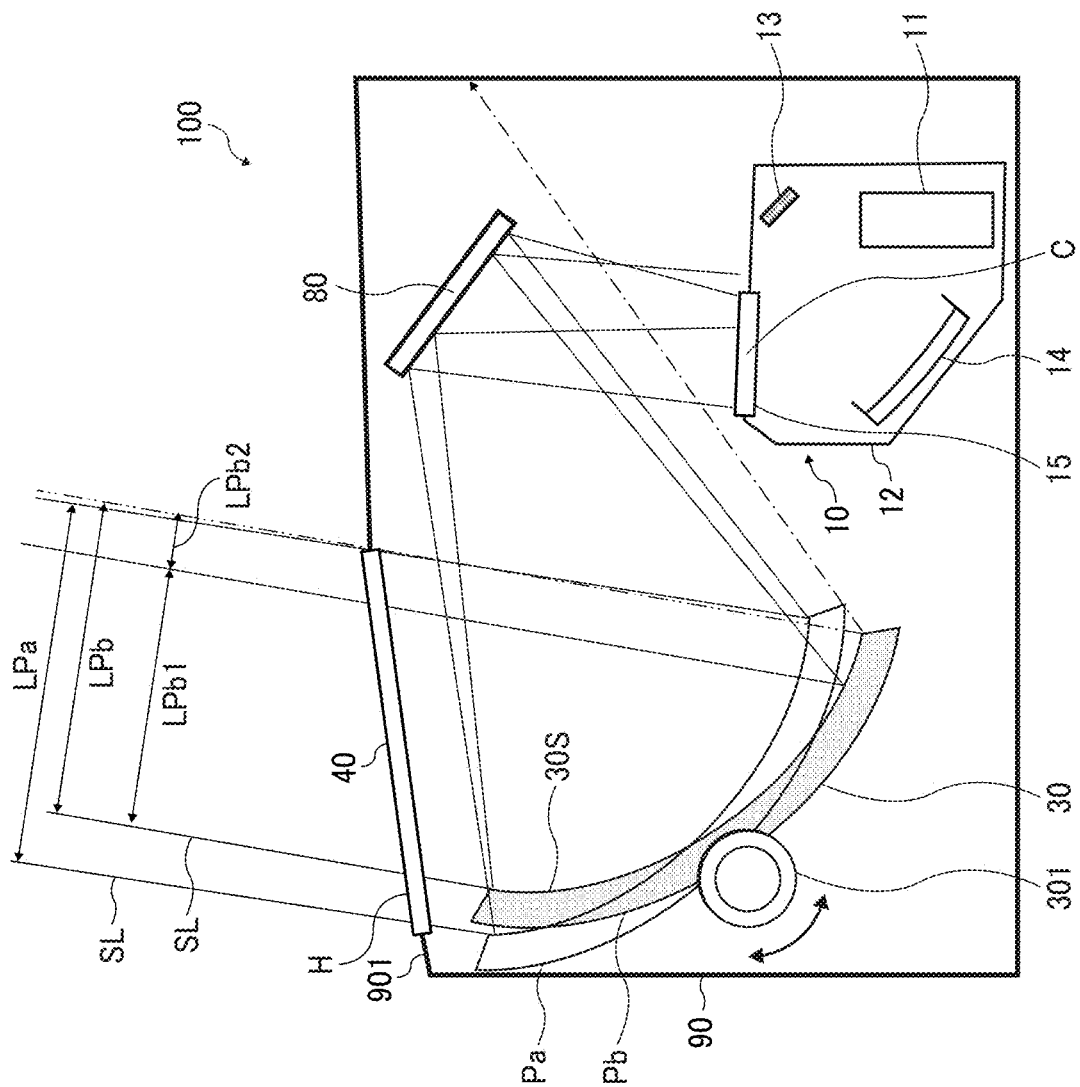
FIG. 18 is a diagram illustrating the relation between the project area of the reflection plane of a free-form surface mirror and a mirror, according to an embodiment of the present disclosure.

FIG. 18 is a diagram illustrating the relation between the project area of the reflection plane 30S of the free-form surface mirror 30 and the mirror 80, according to the present embodiment.

As illustrated in FIG. 12, the largest value Lpb of the project area of the reflection plane 30S, which is projected to the outside of the housing 90 through the hole H, when the free-form surface mirror 30 is at the position Pb is smaller than the largest value Lpa of the project area of the reflection plane 30S, which is projected to the outside of the housing 90 through the hole H, when the free-form surface mirror 30 is at the position Pa. The largest value Lpb of the project area of the reflection plane 30S, which is projected to the outside of the housing 90 through the hole H, corresponds to the largest value for the light flux of the extraneous light radiated on the reflection plane 30S.

By contrast, the light flux of the extraneous light that is radiated on the reflection plane 30S and then is reflected by the reflection plane 30S, with the largest value Lpb, when the free-form surface mirror 30 is at the position Pb, is reflected by the mirror 80 almost in its entirety.

On the other hand, the largest value Lpb for the light flux of the extraneous light that is radiated on the reflection plane 30S and then is reflected by the reflection plane 30S when the free-form surface mirror 30 is at the position Pb may be divided into light flux Lpb1 that is to be reflected by the mirror 80 and light flux Lpb2 that is not to be reflected by the mirror 80.

In the display device 100 according to the present embodiment, the relation among Lpa, Lpb, and Lpb1 is as follows.

$$Lpa > Lpb > Lpb1$$

Accordingly, when the inclination of the reflection plane 30S is changed so as to reduce the project area of the reflection plane 30S, which is projected to the outside of the housing 90 through the hole H on the housing 90, the area of the mirror 80 that is irradiated with the extraneous light that enters the housing 90 through the hole H and then is reflected by the reflection plane 30S can be reduced.

In the second state, the area of the image forming unit 10 that is irradiated with the extraneous light is displaced from the image area 15R1. In other words, the area that is irradiated with the extraneous light does not match the image area 15R1. Accordingly, the reaching area A2b is displaced from the image area 15R1. In other words, the reaching area A1b does not match the image area 15R1. In the of the example as illustrated in FIG. 9, the center of the area that is irradiated with the extraneous light, which travels from the free-form surface mirror 30 to the image forming unit 10, is displaced from the center of the screen 15 and the center C of the image area 15R1. In other words, the center of the area that is irradiated with the extraneous light, which travels from the free-form surface mirror 30 to the image forming unit 10, does not match the center of the screen 15 and the center C of the image area 15R1. As described above, also in the third embodiment of the present disclosure, a situation in which the extraneous light is concentrated onto the screen 15, in particular, can be avoided by rotating the free-form surface mirror 30.

In the configuration where the mirror 80 that serves as a reflection optical system is arranged on the optical path between the screen 15 and the free-form surface mirror 30, the free-form surface mirror 30 is rotated from the first state, and the extraneous light that is indicated by L2c is no longer reflected by the mirror 80 and goes away from the optical path to the image forming unit 10. In other words, the light flux that is radiated to the image forming unit 10 via the mirror 80 is wider when the free-form surface mirror 30 is in the first state than when the free-form surface mirror 30 is in the second state. As a result, the radiant flux towards the image forming unit 10 can be reduced to, for example, less than 2.7 watts (W).

The mirror 80 may include a wavelength-selective element by which the wavelength of reflection light can be selected. In other words, when the mirror 80 has wavelength selectivity in which the visible light included in the projection light PL is mostly reflected but the light included in the sunlight other than the visible light is mostly not reflected, a configuration or structure in which the brightness of the projection light is enhanced and the extraneous light such as the sunlight cannot easily reach the image forming unit 10 can be achieved.

In the present embodiment, the light flux L2b and L2c of the extraneous light is blocked or made to go away from the optical path towards the image forming unit 10. However, even when no light is blocked by the hole surrounding area 901, the radiant flux towards the image forming unit 10 can be reduced just by the shielding function of the mirror 80. The radiant flux of the extraneous light towards the image forming unit 10 can be controlled to desired radiant flux by adjusting the layout and the optical design. The light-shielding plate 70 as described above in the second embodiment of the present disclosure may be applied to the present embodiment.

FIG. 19A and FIG. 19B are diagrams each illustrating the illumination distribution around the image forming unit due to the extraneous light, according to the present embodiment.

More specifically, the illumination distribution around the screen 15 due to the extraneous light when the mirror 80 is disposed between the free-form surface mirror 30 and the screen 15 as in the third embodiment of the present disclosure is illustrated in FIG. 19A and FIG. 19B.

In FIG. 19A and FIG. 19B, a whiter portion indicates a portion with higher illuminance. Each of the frames with broken lines indicates an approximate shape of the image area 15R1 of the screen 15, and each of the cross signs "x" indicates the center C of the image area 15R1. FIG. 19A illustrates a situation in the first state according to the present embodiment. FIG. 19B illustrates an example case in which the free-form surface mirror 30 is rotated by 10 degrees in the second state with reference to 0° position.

In FIG. 19A, the center of an area with high illuminance as irradiated with the extraneous light approximately matches the center C of the image area 15R1. By contrast, in FIG. 19B, the center of an area with high illuminance as irradiated with the extraneous light is shifted to the lower side of the drawing, compared with FIG. 19A, with respect to the center C of the image area 15R1. As described above, according to the present embodiment, it is recognizable that the illumination distribution of the extraneous light deviates from the center C of the image area 15R1 on the screen 15 as the free-form surface mirror 30 is rotated with reference to the first state.

As a result, in FIG. 19B, the radiant flux that reaches the image area 15R1, in particular, is significantly reduced, compared with FIG. 19A, by the extraneous light that is blocked by the hole surrounding area 901 before reaching the free-form surface mirror 30 and the extraneous light that is not incident on the reflection plane of the mirror 80.

As described above, the display device 100 according to an embodiment of the present disclosure includes the screen 15 (an example of an image forming unit) through which image light is exited, the free-form surface mirror (i.e., an example of an imaging optical system) 30 that forms an image by reflecting the image light on the reflection plane 30S, and the housing 90 on which the hole H (an example of a transmissive area) through which the image light reflected by the free-form surface mirror 30 passes is formed and accommodating the screen 15 and the free-form surface mirror 30, and the inclination of the reflection plane 30S is changed so as to reduce the project area of the reflection plane 30S, which is projected to the outside of the housing 90 through the hole H. Accordingly, the adverse effect on the inside of the housing 90, which is caused by the radiant heat of the extraneous light, can be reduced.

The display device 100 is further provided with the mirror 80 (an example of an optical system or a reflection optical system) on the optical path between the screen 15 and the free-form surface mirror 30. Moreover, when the inclination of the reflection plane 30S is changed to reduce the project area of the reflection plane 30S, the area of the mirror 80 that is irradiated with the extraneous light that enters the housing 90 through the hole H and then is reflected by the reflection plane 30S is reduced.

Due to such a configuration, the adverse effect on the screen 15, which is caused by the radiant heat of the extraneous light reflected by the mirror 80, can be reduced.

A similar effect is also expected when a transmissive optical system is provided in place of the mirror 80.

As the mirror 80 includes a wavelength-selective element that mostly reflects the visible light but does not reflect most of the light other than the visible light, a configuration or structure in which the brightness of the projection light is enhanced and the extraneous light such as the sunlight cannot easily reach the screen 15 can be achieved.

In the display device 100, the light-shielding plate 70 that blocks the extraneous light that enters the housing 90 through the hole H and then is reflected by the reflection plane 30S is arranged at a position so as not to block the optical path of the image light. Due to this configuration, a configuration or structure in which the extraneous light such as the sunlight cannot easily reach the screen 15 can be achieved.

Numerous additional modifications and variations are possible in light of the above teachings. It is therefore to be understood that within the scope of the appended claims, the disclosure of the present disclosure may be practiced otherwise than as specifically described herein. For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A display device comprising:
an image generator through which image light exits;
an imaging optical system having a reflection plane on a surface of the imaging optical system and configured to form an image by reflecting the image light on the reflection plane; and
a housing accommodating the image generator and the imaging optical system, the housing having a transmissive area through which the image light reflected by the imaging optical system passes through,
wherein a maximum value of a projected area of the reflection plane visible from outside of the housing through the transmissive area when a reflection area is in a first state is greater than a maximum value of the projected area of the reflection plane visible from outside of the housing through the transmissive area when the reflection area is in a second state,
the display device further comprising an optical system disposed on an optical path between the image generator and the imaging optical system,
wherein, when an inclination of the reflection plane is changed from the first state to the second state to reduce the projected area of the reflection plane, an area of the optical system irradiated with extraneous light that enters the housing through the transmissive area and then is reflected by the reflection plane is reduced.

2. The display device according to claim 1,
wherein the optical system is a reflection optical system configured to reflect the image light exited through the image generator towards the imaging optical system,
wherein, when the inclination of the reflection plane is changed from the first state to the second state to reduce the projected t area of the reflection plane, an area of the optical system that reflects the extraneous light that enters the housing through the transmissive area and then is reflected by the reflection plane is reduced.

3. The display device according to claim 2, wherein the reflection optical system includes a wavelength-selective element.

4. The display device according to claim 1, further comprising a light shield disposed at a position not to block an optical path of the image light, the light shield being configured to block extraneous light that enters the housing through the transmissive area and then is reflected by the reflection plane.

5. The display device according to claim 1, wherein the image light exits through the image generator in a diverging manner.

6. The display device according to claim 1, further comprising processing circuitry configured to output a control signal to change a position of the reflection plane such that an inclination of the reflection plane changes.

7. The display device according to claim 6, further comprising:
a motor to change a position of a mirror to change the maximum value of the projected area from the first state to the second state in response to the control signal.

8. The display device according to claim 1, further comprising:
a motor to change a position of a mirror to change the maximum value of the projected area from the first state to the second state.

9. A display system comprising:
a display device including
an image generator through which image light exits,
an imaging optical system having a reflection plane on a surface of the imaging optical system and configured to form an image by reflecting the image light on the reflection plane, and
a housing accommodating the image generator and the imaging optical system, the housing having a transmissive area through which the image light reflected by the imaging optical system passes through,
wherein a maximum value of a projected area of the reflection plane visible from outside of the housing through the transmissive area when a reflection area is in a first state is greater than a maximum value of the projected area of the reflection plane visible from outside of the housing through the transmissive area when the reflection area is in a second state; and
a reflector configured to reflect the image light reflected by the imaging optical system,
wherein the imaging optical system projects the image light towards the reflector to form a virtual image,
wherein, when an inclination of the reflection plane is changed from the first state to the second state to reduce the projected area of the reflection plane, an area of the optical system irradiated with extraneous light that enters the housing through the transmissive area and then is reflected by the reflection plane is reduced.

10. The display system according to claim 9, further comprising:
a motor to change a position of a mirror to change the maximum value of the projected area from the first state to the second state.

11. The display device according to claim 9, further comprising:
a motor to change a position of a mirror to change the maximum value of the projected area from the first state to the second state in response to a control signal; and
processing circuitry configured to output the control signal to control the motor to change the position of the mirror.

12. A mobile object comprising a display system including
a display device including
an image generator through which image light exits,
an imaging optical system having a reflection plane on a surface of the imaging optical system and configured to form an image by reflecting the image light on the reflection plane, and
a housing accommodating the image generator and the imaging optical system, the housing having a transmissive area through which the image light reflected by the imaging optical system passes through,
wherein a maximum value of a projected area of the reflection plane visible from outside of the housing through the transmissive area when a reflection area is in a first state is greater than a maximum value of the projected area of the reflection plane visible from outside of the housing through the transmissive area when the reflection area is in a second state; and
a reflector configured to reflect the image light reflected by the imaging optical system,
wherein the imaging optical system projects the image light towards the reflector to form a virtual image, and
wherein the reflector is a front windshield,
wherein, when an inclination of the reflection plane is changed from the first state to the second state to reduce the projected area of the reflection plane, an area of the optical system irradiated with extraneous light that enters the housing through the transmissive area and then is reflected by the reflection plane is reduced.

13. The mobile object according to claim 12, further comprising:
a motor to change a position of a mirror to change the maximum value of the projected area from the first state to the second state.

14. The display device according to claim 12, further comprising:
a motor to change a position of a mirror to change the maximum value of the projected area from the first state to the second state in response to a control signal; and
processing circuitry configured to output the control signal to control the motor to change the position of the mirror.

* * * * *